(12) United States Patent
Brandon et al.

(10) Patent No.: US 10,756,377 B2
(45) Date of Patent: Aug. 25, 2020

(54) REGENERATIVE FUEL CELLS

(71) Applicant: Imperial Innovations Limited, London (GB)

(72) Inventors: Nigel Brandon, London (GB); Vladimir Yufit, London (GB); Anthony Kucernak, London (GB); Javier Rubio-Garcia, London (GB)

(73) Assignee: Imperial Innovations Limited, London (GB)

( * ) Notice: Subject to any disclaimer, the term of this patent is extended or adjusted under 35 U.S.C. 154(b) by 148 days.

(21) Appl. No.: 16/061,210

(22) PCT Filed: Dec. 13, 2016

(86) PCT No.: PCT/GB2016/053922
§ 371 (c)(1),
(2) Date: Jun. 11, 2018

(87) PCT Pub. No.: WO2017/103578
PCT Pub. Date: Jun. 22, 2017

(65) Prior Publication Data
US 2018/0366759 A1 Dec. 20, 2018

(30) Foreign Application Priority Data
Dec. 14, 2015 (GB) .................................. 1522003.1

(51) Int. Cl.
*H01M 8/18* (2006.01)
*H01M 8/1009* (2016.01)
(Continued)

(52) U.S. Cl.
CPC ............. *H01M 8/188* (2013.01); *H01M 4/96* (2013.01); *H01M 8/04186* (2013.01); *H01M 8/1009* (2013.01); *Y02E 60/528* (2013.01)

(58) Field of Classification Search
CPC ........ H01M 8/188; H01M 8/184; H01M 8/186
See application file for complete search history.

(56) References Cited

U.S. PATENT DOCUMENTS

2012/0045680 A1* 2/2012 Dong ................ H01M 8/04186
429/109
2015/0004445 A1* 1/2015 Brandon ............... H01M 8/188
429/51

FOREIGN PATENT DOCUMENTS

CN 101110481 A 1/2008
EP 2846389 A1 3/2015
(Continued)

OTHER PUBLICATIONS

Livshits, et al., "High-power H2/Br2 fuel cell", Electrochemistry Communications, vol. 8(8), pp. 1358-1362 (2006).
(Continued)

*Primary Examiner* — Olatunji A Godo
(74) *Attorney, Agent, or Firm* — Andrus Intellectual Property Law, LLP

(57) ABSTRACT

There is provided a regenerative fuel cell capable of operating in a power delivery mode in and in an energy storage mode. The cell may comprise a reversible hydrogen gas anode, in an anode compartment, a reversible cathode in a cathode compartment, and a membrane separating the anode compartment from the cathode compartment, which membrane is capable of selectively passing protons. an additive may be provided in the cathode compartment.

20 Claims, 19 Drawing Sheets

(51) Int. Cl.
*H01M 8/04186* (2016.01)
*H01M 4/96* (2006.01)

(56) References Cited

FOREIGN PATENT DOCUMENTS

| | | |
|---|---|---|
| KR | 101436779 B1 | 9/2014 |
| WO | 2011089518 A2 | 7/2011 |
| WO | 2013104664 A1 | 7/2013 |
| WO | 2015147582 A1 | 10/2015 |

OTHER PUBLICATIONS

Fatih et al., "Advancements in the Direct Hydrogen Redox Fuel", Electrochemical and Solid-State Letter, 11(2) B11-B15 (2008).
Hosseiny, et al., "Electrochemistry Communications", vol. 13, pp. 751-754 (2011).
Combined Search and Examination Report for GB1522003.1 dated Aug. 4, 2016.
International Search Report and the Written Opinion for PCT/GB2016/053922 dated Feb. 7, 2017.

\* cited by examiner

US 10,756,377 B2

REGENERATIVE FUEL CELLS

CROSS-REFERENCE TO RELATED APPLICATIONS

This application is the U.S. national stage application of International Application PCT/GB2016/053922, filed Dec. 13, 2016, which international application was published on Jun. 22, 2017, as International Publication WO2017/103578 in the English language. The international application is incorporated herein by reference, in entirety. The international application claims priority to GB Patent Application No. 1522003.1, filed Dec. 14, 2015, which is incorporated herein by reference, in entirety.

TECHNICAL FIELD

The present invention relates generally to the field of regenerative fuel cell (RFC) technology. More specifically, the invention relates to the use of additives in RFC technology.

BACKGROUND ART

Regenerative fuel cells, and the methods by which they are able to store and deliver electricity, have been known for many years. They are electrochemical apparatus for energy storage and power delivery. In the power delivery phase, electrochemically active species are supplied to electrodes, where they react electrochemically to produce electrochemical power. In a storage phase, electrical power is used to regenerate the electrochemically active species, which are stored.

Because the electrochemically active species can be stored separately from the electrode compartments and supplied when required, the generating capacity of this equipment can be quite large and scalable.

The electrochemical reactions take place on either side of an ion transport system (such as a membrane) with charge carriers either being transported or exchanged by the membrane.

The fundamental electrochemical process in these regenerative fuel cell (RFC) systems can be described by a simple redox equation where the action proceeds in one direction in the energy storage mode of the system and in the opposite direction during the power delivery mode of the system and the term "redox" defines reactions in which a reduction and a complementary oxidation occur together.

However the implementation of these systems in practical applications has encountered major limitations, despite what appears to be a simple electrochemical process. Practical problems have included the use of hazardous materials, poor efficiencies, system size, plugging and clogging of the flow of the electrolytes, crossover of the species, gas formation and, especially, the cost of materials and the cost of equipment. These have prevented RFCs from being employed widely in industry.

There is a wide range of potential applications for energy storage technologies. Most renewable energy technologies cannot easily adjust their power output to meet fluctuating demand and therefore energy storage is important in enabling low carbon/renewable energy sources to be implemented in practice. Energy storage technologies may also be used as a remote power source, to ensure constant power supply and quality and may also be used to reduce the cost of electricity by storing energy when electricity is cheap and distributing the stored energy at peak times.

One of the disadvantages faced by all regenerative fuel cells that have a metal redox couple is that hydrogen and/or oxygen co-evolution may occur when the metal ions are electrochemically reduced.

A liquid/gas fuel cell which employs hydrogen gas and liquid bromine electrolyte has been investigated by Livshits et al. (Electrochemistry Communications, 2006, vol. 8(8), 1358-62). Later, the hydrogen-bromine fuel cell was adapted into a RFC by EnStorage Flow Systems. Although this system has demonstrated a high discharge output power, there are a number of drawbacks to using this system including a low catalyst stability and bromine gas evolution during operation. More recently WO2011/089518 has proposed a hydrogen-bromine regenerative fuel cell and also mentions using a hydrogen-iron redox system. However, due to the low standard electrochemical potential of the iron II/III redox couple (0.77 V vs SHE), the average working voltage of such a hydrogen-iron system at discharge will be even lower (indeed it is the lowest among known regenerative fuel cells) which is a significant disadvantage for practical redox battery applications. Another liquid/gas RFC which has been investigated is the vanadium/air RFC (Hosseiny, S. S., et al, Electrochemistry Communications, 2011, vol. 13, 751-754); however this system has low efficiency, low power density and poor rechargeability.

It is important to realise that regenerative fuel cells are distinct from standard fuel cells. Standard fuel cells consume fuel and can normally only be run in a power delivery mode; they either cannot be run in an energy storage mode (in which power is stored) or, if they can, they can only do so in a highly inefficient way. Furthermore, reversing the electrochemical reaction in a fuel cell can cause permanent damage to the catalyst. Standard fuel cells are optimised for operating in the energy generating mode only while regenerative fuel cells are optimised for the combined power delivery mode and the energy storage mode. Thus only electrochemical reactions that are readily reversible can be used in a regenerative fuel cell, while in certain fuel cells (such as direct alcohol, or direct borohydride fuel cells, or hydrogen/oxygen fuel cells) the reactions need not be reversible and indeed they are usually not. Because of these considerations, regenerative fuel cells will normally use at least one different electrochemical reaction, as compared to standard fuel cells, although where a fuel cell clearly uses half cells that both use a readily reversible redox reaction, e.g. the hydrogen-I system disclosed in "Advancements in the Direct Hydrogen Redox Fuel", *Electrochemical and Solid-State Letters*, 11 (2) B11-B15 (2008), such a system can be used both in fuel cells and regenerative fuel cells.

In addition the average operating voltage during discharge is important. A low voltage system will require either a higher number of cells in electrical series to increase the voltage, or the design of bespoke power converters to deal with low voltage-high current systems, which adds both complexity and cost to the system.

Therefore finding two redox couples for use in a regenerative fuel cell that are reversible, soluble at practical concentrations (about 1 M or above), have a suitable potential difference between the standard electrode potentials ($E^{\ominus}/V$) of the couples and overcome the problems in the art is a challenging task.

WO2013104664 (A1) overcomes the above problems by providing a hydrogen gas/dissolved metal ion regenerative fuel cell where the metal is selected from vanadium, cerium, manganese or their stable and electrochemically reversible aqueous complexes. Vanadium, cerium and manganese have relatively high electrochemical redox potentials:

| Redox reaction | Standard potential $E_0$ |
|---|---|
| $Ce^{4+} + e^- \rightleftharpoons Ce^{3+}$ | 1.72 V |
| $Mn^{3+} + e^- \rightleftharpoons Mn^{2+}$ | 1.54 V |
| $VO_2^+ + 2H^+ + e^- \rightleftharpoons VO_2^{2+} + H_2O$ | 0.99 V |

In particularly preferred embodiments, WO2013104664 (A1) provides a hydrogen gas/dissolved vanadium ion regenerative fuel cell. The inventive regenerative fuel cells, and especially the hydrogen/vanadium ion system, at least partly overcome the problems of the all-vanadium RFCs (VRBs) currently in use in that costs are significantly reduced by halving the amount of expensive vanadium required. Furthermore, replacing large liquid electrolyte storage tanks with compressed gas storage vessels for hydrogen dramatically reduces the amount of space taken up by the regenerative fuel cell, which further reduces costs. Other advantages include an increase in output power of the system due to the lower overpotential of the hydrogen oxidation reaction. The preferred hydrogen/vanadium RFC provides a further advantage in that existing vanadium/vanadium RFC systems can be readily adapted to replace the vanadium anode with a hydrogen anode, thereby reducing the capital cost of installing the regenerative fuel cells of the present invention by preventing the need to install an entire system. This retro-fitting aspect therefore overcomes a substantial draw-back of using new systems for those who have already invested considerable capital in existing technology and is an important aspect of the present invention.

Despite the problems overcome by the RFCs disclosed in WO2013104664 A1, the issues of poor efficiencies, system size, plugging and clogging of the flow of the electrolytes, ion exchange membrane fouling and high capital cost, remain, preventing RFCs from being employed widely in industry.

For example, Mn is an abundant and cheap metal with high redox potential ($E^{\ominus}$-Mn(III)/Mn(II)=1.51 V) interesting for energy storage applications. However, the implementation of Mn-based electrolyte in regenerative fuel cells has been elusive to this date due to undesired precipitation reactions. During cell charging Mn(III) is produced and as shown below in Equation 2, this ion spontaneously undergoes disproportionation leading to precipitation of $MnO_2$ with a consequent drop in cell capacity.

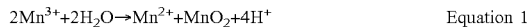

$$2Mn^{3+} + 2H_2O \rightarrow Mn^{2+} + MnO_2 + 4H^+ \qquad \text{Equation 1}$$

Higher metal solubility in the liquid phase permits higher cell energy density and reduces the frequency of plugging and clogging of the flow of the electrolytes and reduces ion exchange membrane fouling. In this context, the present invention concerns liquid electrolytes containing organic and/or inorganic additives in hydrogen (anode)/liquid electrolyte (cathode) regenerative fuel cells leading to an improved performance. This has a dramatic positive impact on the cost of the system, efficiency and energy density of the cell unreported to this date.

Regenerative fuel cells can generally be distinguished from fuel cells by their "plumbing". A regenerative fuel cell has both conduits for supplying fuel to the electrodes for the power delivery phase, and also conduits for conducting the spent fuel to a store so that it can be regenerated. Often the fuel will be in the form of electrolyte that is exhausted following a power delivery phase and in this case the conduits will also be arranged to conduct exhausted (or spent) electrolyte to a store and supply it back to its half cell during an energy storage mode, e.g. by the use of appropriate pumps. In contrast, fuel cells are not set up to operate in energy storage mode to electrochemically replenish exhausted electrolyte. In the case of regenerative fuel cells having a half cell containing a gas electrode, a compressor is generally provided to compress gas generated during the energy storage mode to enable it to be collected in a compressed gas storage tank for future power delivery phases (although neither a compressor nor a storage tank is required where the electrode is an oxygen electrode since oxygen is freely available from the atmosphere). In contrast a fuel cell will generally not have such a compressor.

DISCLOSURE OF THE INVENTION

The present invention is defined in the accompanying claims.

The present invention relates to a regenerative fuel cell (RFC), that is to say an electrochemical apparatus configured for both energy storage and power delivery and has an anolyte compartment and a catholyte compartment separated by a membrane capable of selectively passing protons, that is to say the membrane can transfer protons e.g., by being selectively permeable to protons or is a proton exchange membrane. Specifically, the present invention relates the use of additives in the electrolyte formulation to improve the system.

In accordance with standard terminology in the field of regenerative fuel cells, the terms "anode" and "cathode" are defined by the functions of the electrodes in the power delivery mode. To avoid confusion, the same terms are maintained to denote the same electrodes throughout the two modes of operation (power deliver and energy storage) of the RFC. The terms "anolyte" and "catholyte" will be used to denote the electrolyte in contact with the "anode" and "cathode".

In a power delivery mode, an electrochemically active species is oxidised at the anode and an electrochemically active species is reduced at the cathode to form reacted (or "spent") species. In the energy storage mode, the electrochemical system is reversed and the "spent" cathode species is electrochemically oxidised at the cathode to regenerate the corresponding electrochemically active species. It will be appreciated that the redox reaction at the hydrogen gas anode will not produce any "spent" species in the power delivery mode as the electrochemically active species (hydrogen gas) is transformed into protons that are dissolved in the electrolyte. Protons are selectively passed by the membrane separating the anode and cathode compartments from the anode side of the membrane to the cathode side of the membrane. The electrons produced during the oxidation of the hydrogen gas at the anode during the power delivery mode are collected by a current collector. However, any unreacted hydrogen gas may be transferred away from the anode compartment by one or more conduits and returned to a pressurised gas source vessel. In the energy storage mode, protons are selectively passed by the membrane separating the anode and cathode compartments from the cathode side of the membrane to the anode side of the membrane and protons are reduced at the anode to regenerate the hydrogen gas, which forms the anode electrochemically active species.

Therefore, in accordance with an aspect of the present disclosure there is provided a regenerative fuel cell that is capable of operating in a power delivery mode in which it generates electrical power by the reaction of an electrochemically active species at an anode and the reaction of a different electrochemically active species at a cathode and that is also capable of operating in an energy storage mode in which it consumes electrical power to generate said electrochemically active species, the cell comprising:

a reversible hydrogen gas anode, in an anode compartment;

a reversible cathode in a cathode compartment;

a membrane separating the anode compartment from the cathode compartment, which membrane is capable of selectively passing protons;

conduits configured to supply electrochemically active species to the anode and to the cathode in said power delivery mode, and to carry generated electrochemically active species away from the anode and away from the cathode in said energy storage mode;

wherein the redox reaction at the anode is:

$$2H^+ + 2e^- \rightleftharpoons H_2 \text{ (gas)}$$

and the redox reaction at the cathode is one selected from:

$$V^{5+} + e^- \rightleftharpoons V^{4+}, \quad \text{(i)}$$

$$Ce^{4+} + e^- \rightleftharpoons Ce^{3+}, \text{ and} \quad \text{(ii)}$$

$$Mn^{3+} + e^- \rightleftharpoons Mn^{2+} \quad \text{(iii)}$$

a metal ion such as $Al^{3+}$, $TiO^{2+}$, $Ti^{4+}$ or an organic material such as a surfactant, chelating agent, a polymer or a dendrimer, present as an additive.

For the cathode side of the regenerative fuel cell, the electrochemically active species is present in liquid catholyte supplied to the catholyte electrode compartment. In respect of the anode, the electrochemically active species is hydrogen and the anolyte electrode is a gas permeable electrode.

The electrochemically active species present in the catholyte may be stored in a first vessel ready for passing to the cathode compartment in the power delivery mode. For the anode, the electrochemically active species is hydrogen gas, and will generally be in the form of a pressurised gas source.

During the power delivery mode, the spent catholyte is collected in a vessel, which may be the first vessel or a separate second vessel. During the energy storage mode, the spent electrolyte may be supplied from the vessel to the cathode compartment, where the electrochemically active species is regenerated. The first and second vessels (if provided) may be different compartments of a single container.

The regenerative fuel cell may additionally include a pump which allows the liquid catholyte to be circulated through the conduits between the storage vessel and the cathode compartment. As described above, the regenerative fuel cell may include a compressor that allows the hydrogen gas to be stored at pressure in a source vessel exterior to the electrochemical cell. The regenerative fuel cell may also additionally include a dryer which dries the hydrogen gas before it is stored in the source vessel. The regenerative fuel cell may also be equipped with a hydrogen expander-generator to deliver electricity as a result of compressed gas expansion.

The electrochemical reactions may take place at a discrete anode and cathode or, particularly in the case of the gas anode, they will generally take place at the gas separation membrane/catalysed porous gas electrode interface and so it may not always be easy to identify a discrete anode and cathode and the main manifestations of the anode and the cathode may simply be the anodic and cathodic current collectors, which facilitate the supply of electrons to an electrode from an external circuit and the removal of electrons from an electrode to the external circuit (in the power delivery mode, the anodic current collector will transfer electrons away from the anode to an external circuit, and the cathodic current collector will supply electrons from the external circuit to the cathode. In the energy storage mode, this will be reversed).

The anode is a porous gas electrode and the cathode may be a porous or non-porous electrode, although porous electrodes are preferred. Examples of suitable electrodes are well known in the art. Catalysed porous carbon electrodes are particularly preferred in the present invention, for example catalysed carbon paper, cloth, felt or composite. The carbon may be graphitic, amorphous, or have glassy structure. In a particularly preferred embodiment of the invention, the anode is a catalysed electrode and the cathode is a non-catalysed electrode. As the redox reaction at the cathode does not usually require catalysis, having a regenerative fuel cell whereby only one of the electrodes is catalysed may allow the production costs of the regenerative fuel cell to be significantly reduced; it is possible, but not necessary, to use some non-noble metal catalyst and this would also keep the cost down as compared to the use of noble metal catalysts. The catalyst used in the anode may be of noble metals such as for example platinum, palladium, iridium, ruthenium, rhenium, rhodium, osmium or combinations thereof, including alloys for example a platinum/ruthenium alloy or binary catalyst such as PtCo, PtNi, PtMo etc. or ternary catalyst PtRuMo, PtRuSn, PtRuW etc. or chalcogenides/oxides as RuSe, Pt—MoO$_x$ etc. Some binary/ternary or other than pure precious metal catalysts can be more tolerant to probable catalytic poisoning as results of catholyte species crossover. The amount of precious metal can be significantly reduced as compared to normal catalysed fuel cell gas electrodes since RFCs are not required to operate at the same high power mode as conventional fuel cells.

The electrochemically active species present in the anode half cell is hydrogen gas. Therefore, the redox reaction which takes place at the anode is:

$$2H^+ + 2e^- \rightleftharpoons H_2 \text{ (gas)}$$

The hydrogen gas is stored externally to the anode compartment in a container, which may be a pressurised gas source vessel. The hydrogen gas may be supplied to the anode compartment by one or more conduits in the power delivery mode and may be carried away from the anode compartment by one or more conduits in the energy storage mode.

The electrochemically active species present in the cathode half cell may be one of $V^{5+}$, $Ce^{4+}$ or $Mn^{3+}$, and the respective "spent" species are $V^{4+}$, $Ce^{3+}$ or $Mn^{2+}$. Therefore the redox reaction which takes place at the cathode is selected from:

$$V^{5+} + e^- \rightleftharpoons V^{4+}, \quad \text{(i)}$$

$$Ce^{4+} + e^- \rightleftharpoons Ce^{3+}, \text{ and} \quad \text{(ii)}$$

$$Mn^{3+} + e^- \rightleftharpoons Mn^{2+}. \quad \text{(iii)}$$

In a preferred embodiment, the redox reaction which takes place at the cathode is:

$$Mn^{3+} + e^- \rightleftharpoons Mn^{2+}$$

Additionally, the catholyte contains an additive, which helps prevent undesired precipitation reactions. The additive can be an inorganic additive or an organic additive. When the additive is organic, it can be a surfactant, polymer, or dendrimer. When it is inorganic it can be a source of a metal ion. Specifically, it can be a source of $Al^{3+}$, $TiO^{2+}$ or $Ti^{4+}$.

The Regenerative Fuel Cells of the present invention provide the advantages/overcome the problems discussed above, most notably (a) the reduction of costs as compared to the all-vanadium RFCs (VRBs) currently in use by halving the amount of expensive metal ions, and especially vanadium, required, (b) a reduction in the amount of space taken up by the regenerative fuel cell resulting from the replacement of large liquid electrolyte storage tanks in VRBs with compressed gas storage vessels for hydrogen, (c) an increase in output power of the system due to the lower overpotential of the hydrogen oxidation reaction, (d) in the case the preferred hydrogen/vanadium RFC, it can be retrofitted to existing VRBs which reduces the capital investment needed to replace VRBs and (e) reduced rates of precipitation of electroactive species, which in turn results in higher metal solubility in the liquid phase permitting higher cell energy density and reduced frequency of plugging and clogging of the flow of the electrolytes and reduced ion exchange membrane fouling.

It will be appreciated that although the electrochemically active species present in the cathode half cell is referred to as a free cation e.g. $M^{n+}$, it may be present in the catholyte solution as any stable positively charged complex, for example, an oxide complex, such as $VO_2^+$ and $VO^{2+}$ or a complex formed with a surfactant, polymer or dendrimer additive. The nature of the positively charged complex will depend on the materials used to produce the catholyte solution. For example, when the electrochemically active species present in the cathode half cell is vanadium, the liquid catholyte may be prepared using tetravalent vanadium oxide ($VO_2$), vanadyl sulphate ($VOSO_4$) or pentavalent vanadium oxide ($V_2O_5$), $Ce^{III}_2(SO_4)_3/Ce^{IV}(SO_4)_2$ or trivalent cerium carbonate $Ce^{III}_2(CO_3)_3$. When the electrochemically active species present in the cathode half cell is manganese, the liquid catholyte may be prepared using divalent manganese ($MnSO_4$) or divalent manganese carbonate ($MnCO_3$). The electrolytes will generally be aqueous.

The electrochemically active species in the cathode half cell is present in liquid electrolyte. Acidic electrolytes are well known in the art and any standard acidic electrolytes may be used in accordance with the present invention. Preferred electrolytes include sulphuric acid, which may be an aqueous solution of concentrated sulphuric acid, methanesulfonic acid (MSA) or trifluoromethanesulfonic acid (TFSA), or mixtures thereof, most preferably sulphuric acid. Due to the high electrochemical potential of redox couples such Ce and Mn, the use of organic acid electrolyte will be preferable in order to minimise oxygen generation during energy storage mode (charging). The use of any other strong acid is not prohibited if the acid can form soluble metal cations but not reduce or oxidise the catholyte. The concentration of the electrochemically active species in the catholyte determines the power and energy density of the regenerative fuel cell. Therefore, the concentration of electrochemically active species in the catholyte is preferably at least 0.2 M, and more preferably greater than 0.5 M, e.g. greater than 1 M or greater than 1.5 M. The maximum practical concentration of the electrochemically active species will generally be governed by its solubility in the electrolyte as precipitation from the electrolyte becomes an increasing problem at higher concentrations, and the presence of precipitated materials in the cell is preferably avoided since it interferes with the flow of the electrolyte and the functioning of the regenerative fuel cell in question.

The membrane separating the anode compartment from the cathode compartment is a membrane capable of selectively passing protons (hydrogen ions), which means that the membrane may be a proton exchange membrane or a membrane which is permeable to protons. Preferably, the membrane is a proton exchange membrane. Proton exchange membranes are well known in the art, for example, the Nafion™ ion exchange membrane produced by DuPont. Although the Nafion™ membrane has good proton conductivity and good chemical stability, it has a number of disadvantages including a high permeability to vanadium cations and high cost. Therefore, in other preferred embodiments, the membrane is substantially impermeable to metal cations, for example vanadium, cerium and manganese cations.

The additive may comprise one or more of: ammonium phosphate, potassium phosphate, Ammonium Carbonate, Polyacrylic acid, Polyacrylamide, Polymaleic acid, Alanine, Glycine, SodiumPolyPhos., Sod.TriPolyPhos, Ammonium Sulphate, Potassium Sulphate, Poly Styrene S. Acid, Teric PE61, ICI, Teric BL8, ICI, Flocon-100, Calgon EL-5600, Briquest 3010-25, pHreedom, SHMP, K2SO4, K3PO4, KHSO4, Ethlyene diamine tetramethylene phosphonic acid (EDTMP), and CL-4000. These additives may find particular use where redox reaction at the cathode is (i) $V^{5+} + e^- \rightleftharpoons V^{4+}$.

Indeed, according to a further aspect there is provided a regenerative fuel cell capable of operating in a power delivery mode in which it generates electrical power by the reaction of electrochemically active species at an anode and a cathode and in an energy storage mode in which it consumes electrical power to generate said electrochemically active species, the cell comprising:

a reversible hydrogen gas anode, in an anode compartment;

a reversible cathode in a cathode compartment;

a membrane separating the anode compartment from the cathode compartment, which membrane is capable of selectively passing protons;

conduits configured to supply electrochemically active species to the anode and to the cathode in said power delivery mode, and to carry generated electrochemically active species away from the anode and away from the cathode in said energy storage mode;

wherein the redox reaction at the anode is:

$$2H^+ + 2e^- \rightleftharpoons H_2 \text{ (gas)};$$

the redox reaction at the cathode is:

$$V^{5+} + e^- \rightleftharpoons V^{4+},$$

and the cathode compartment comprises an additive. The additive may comprise one or more of: hydrogen chloride, ammonium phosphate, potassium phosphate, another phosphate species, ammonium Carbonate, polyacrylic acid, polyacrylamide, polymaleic acid, alanine, glycine, sodiumPolyPhos., sod.TriPolyPhos, ammonium sulphate, potassium sulphate, polystyrene s. acid, Teric PE61, ICI, Teric BL8, ICI, Flocon-100, Calgon EL-5600, Briquest 3010-25, pHreedom, SHMP, K2SO4, K3PO4, KHSO4, Ethlyene diamine tetramethylene phosphonic acid (EDTMP), and CL-4000. A corresponding method may also be provided. As the skilled person would recognise, preferred or optional features applied to one aspect may also be applied to another.

DESCRIPTION OF EMBODIMENTS AND EXAMPLES

Figure 1:
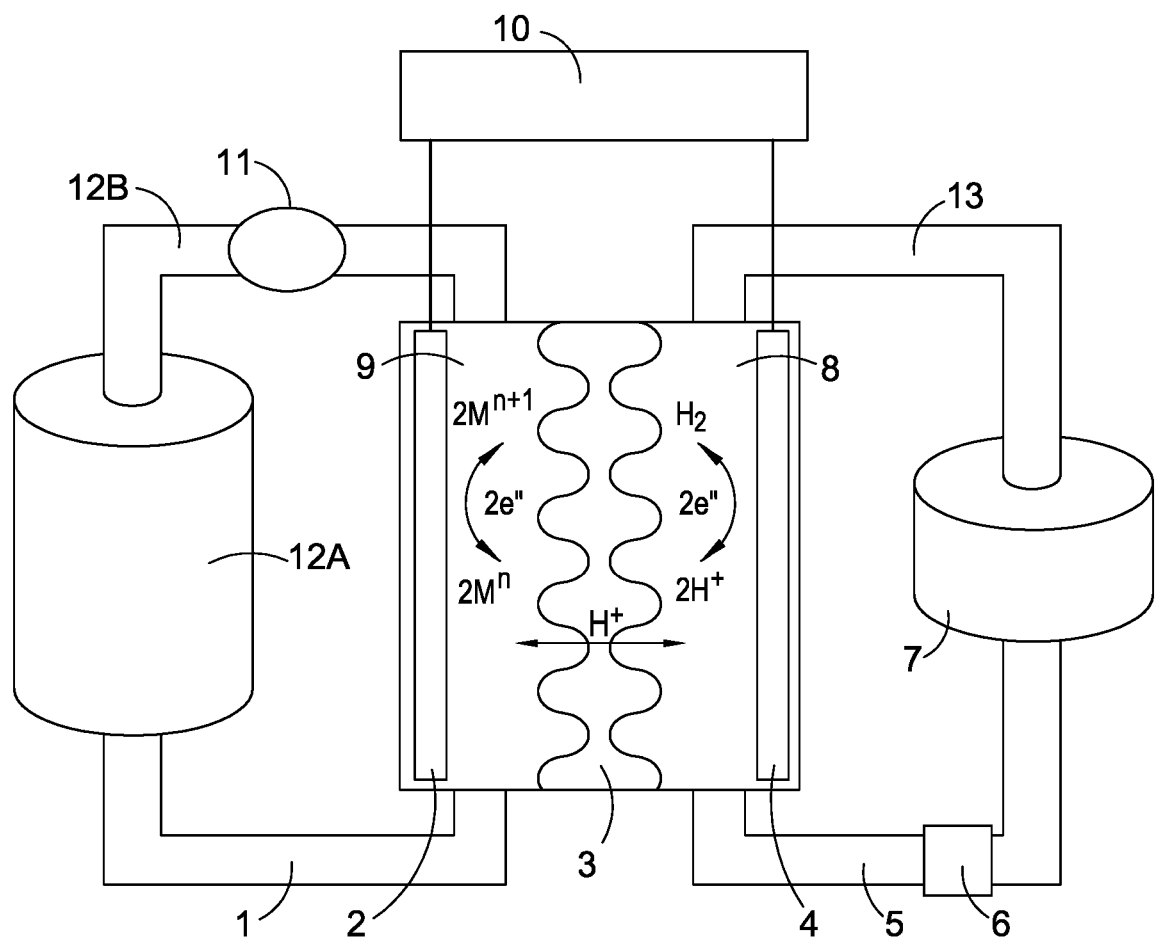
FIG. 1 is a schematic sectional view of a liquid/gas regenerative fuel cell of the invention (the terms "liquid" and "gas" denoting the phases of the electrochemically active material supplied to the two electrodes).

FIG. 1 shows a schematic of a regenerative fuel cell in which the electrochemically active materials used to generate power are (a) hydrogen gas (supplied to the anode) and (b) dissolved metallic ions in a liquid catholyte (supplied to the cathode).

In the power delivery mode, the liquid catholyte containing the electrochemically active species $M^{n+1}$ is pumped by a pump (11) from a compartment of a catholyte storage container (12A), through a conduit (12B) and into the catholyte compartment (9), where it is reduced at a cathode (2) according to the half reaction:

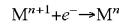

$$M^{n+1} + e^- \rightarrow M^n$$

The catholyte containing the spent electrolyte species $M^n$ is then carried away from the catholyte compartment through a second conduit (1) to the catholyte storage container (12A), where it is stored in a compartment separate from the fresh catholyte compartment. The catholyte further comprises an additive.

The anode and at least part of the anolyte compartment (8) are formed by a porous gas flow electrode and hydrogen is supplied from a pressurised gas source vessel (7) through a conduit (13), to the anode/anode compartment (8), where the hydrogen is oxidised to protons (H$^+$) according to the half reaction:

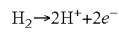

$$H_2 \rightarrow 2H^+ + 2e^-$$

and the current is collected by a current collector (4). A proton exchange membrane (3) separates the anolyte and catholyte compartments (8 and 9) and selectively passes the protons from the anolyte to the catholyte side of the membrane (3) to balance the charge, thereby completing the electrical circuit. Any unreacted hydrogen is carried away from the anolyte compartment (8) by a second conduit (5) and returned to the pressurised gas source vessel (7).

In the energy storage mode, the system is reversed so that the electrochemically active species $M^n$ is pumped from the catholyte storage container (12A), through the conduit (1) to the catholyte compartment (9), where the spent electrolyte species $M^n$ is oxidised at the cathode (2) to form the electrochemically active species $M^{n+1}$. The resulting regenerated electrolyte is transferred away from the catholyte container (9) by the pump (11), through the second conduit (12B) to the catholyte storage container (12A). Meanwhile, protons at the anolyte side of the proton exchange membrane (3) are catalytically reduced at the porous gas anode (4) to hydrogen gas; the hydrogen is transferred away from the porous anode (4) through the conduit (5) and optionally compressed by the compressor (6) before being stored in the pressurised gas source vessel (7).

It will be appreciated that the species $M^{n+1}/M^n$ may be any of $V^{5+}/V^{4+}$, $Ce^{4+}/Ce^{3+}$, $Mn^{3+}/Mn^{2+}$, preferably $Mn^{3+}/Mn^{2+}$.

Example 1: Vanadium Cell

A 25 cm² active area regenerative vanadium fuel cell (RVFC) was produced and tested as set out below. Details of the particular components used in the above cell are set out below: Serpentine flow channel plates were CNC-machined from highly conductive polymer composite Electrophen (Bac2) purposely produced for fuel cell bipolar plate applications. Plastic end plates were cut from PTFE sheet and were sandwiched between aluminium plates to guarantee even pressure distribution across the cell. A commercially available HiSPEC™ M-200 Class MEAs (Johnson Matthey Fuel Cells) with 25 cm² of catalytic active area were used in all experiments [Johnson Matthey http://www.jmfuelcells.com/products/meas]. To minimise iR losses and provide good electric conductivity gold plated copper current collectors were inserted between end and flow channel plates. Finally, Viton rubber gaskets were placed between different cell components to ensure the system be properly sealed during the operation.

Preparation of Vanadium Sulphate Solution

Vanadium catholyte solutions of 0.23 M and 1 M were prepared by dissolving corresponding amounts of vanadyl sulphate (Sigma-Aldrich) in 5M concentrated sulphuric acid. A Masterflex easy-load peristaltic pump and Masterflex Chem-Durance tubing were used to pump the vanadium catholyte through the cell.

Typically VRBs use vanadium concentrations in the order of 1.5M-2.0M. However, a 0.23M solution was chosen as it would suffice to give an initial indication of the cells performance. Using a lower concentration also allows for shorter charge and discharge times at low current densities. This solution was used for all experiments, except where indicated otherwise.

Charge and Discharge Cycle

Standard Cycle

The following procedure details the standard steps taken when performing a charge/discharge cycle. The cathloyte and hydrogen flow rates remained constant throughout the procedure.

1. The system was discharged to a target voltage of 0.45 V using the current density at which the cycle was to be performed. If the system's state of charge (SOC) was below this target, the system was charged to a point above the target SOC and then discharged to 0.45 V.
2. The open circuit voltage (OCV) of the system was measured for 5 minutes.
3. The system was charged at the desired current density until the upper voltage cut-off limit was reached.
4. The OCV of the system was measured for 5 minutes.
5. The system was discharged at the desired current density until the lower voltage cut-off limit was reached.
6. The OCV of the system was measured for 5 minutes.

Cycle Between Set Capacities

1. The system was discharged to a target voltage of 0.45 V using the current density at which the cycle was to be performed. If the system's SOC was below this target the system was charged to a point above the target SOC and then discharged to 0.45 V.

2. The time t (in seconds) required to reach the desired capacity for a particular current is calculated using Equation 2.

$$t = \frac{n \cdot F \cdot C \cdot V}{I} = \frac{Q}{3.6 \cdot I} t[s] = 3.6 * \frac{\text{Capacity [mAh]}}{\text{Current [A]}} \quad \text{Equation 2}$$

$$t[s] = \frac{\text{Capacity [mAh]} \times 3{,}600 \left[\frac{s}{hr}\right] \times 1_0^{-3} \left[\frac{A}{mA}\right]}{i[A]}$$

Where n—number of electrons, F—Faraday number, C—species concentration [mole/L], V—total solution volume [L], I—current [A], Q—capacity [mAh]

3. The OCV of the system was measured for 5 minutes.
4. The system was charged at the desired current density for the time calculated in step 2 or until the upper voltage cut-off limit was reached.
5. The OCV of the system was measured for 5 minutes.
6. The system was discharged at the desired current density for the time calculated in step 2 or until the lower voltage cut-off limit was reached.
7. The OCV of the system was measured for 5 minutes.

The upper voltage cut-off of 1.7 V was selected due to the risk of corrosion to the carbon paper at voltages above 1.9 V (Joerissen et al, Journal of Power Sciences, 2004, vol. 127(1-2), 98-104) and excessive oxygen evolution due to water oxidation. The lower voltage cut-off of 0.45 V was selected due to the reduction of V(IV) ions to V(III) ions at voltages below 0.35 V (Pourbaix diagram at pH 0).

System Testing

Charge/Discharge Cycle at 0.23 M V(V)/V(IV)

A number of charge/discharge cycles were performed to analyse the behaviour of the RVFC.

Figure 2:
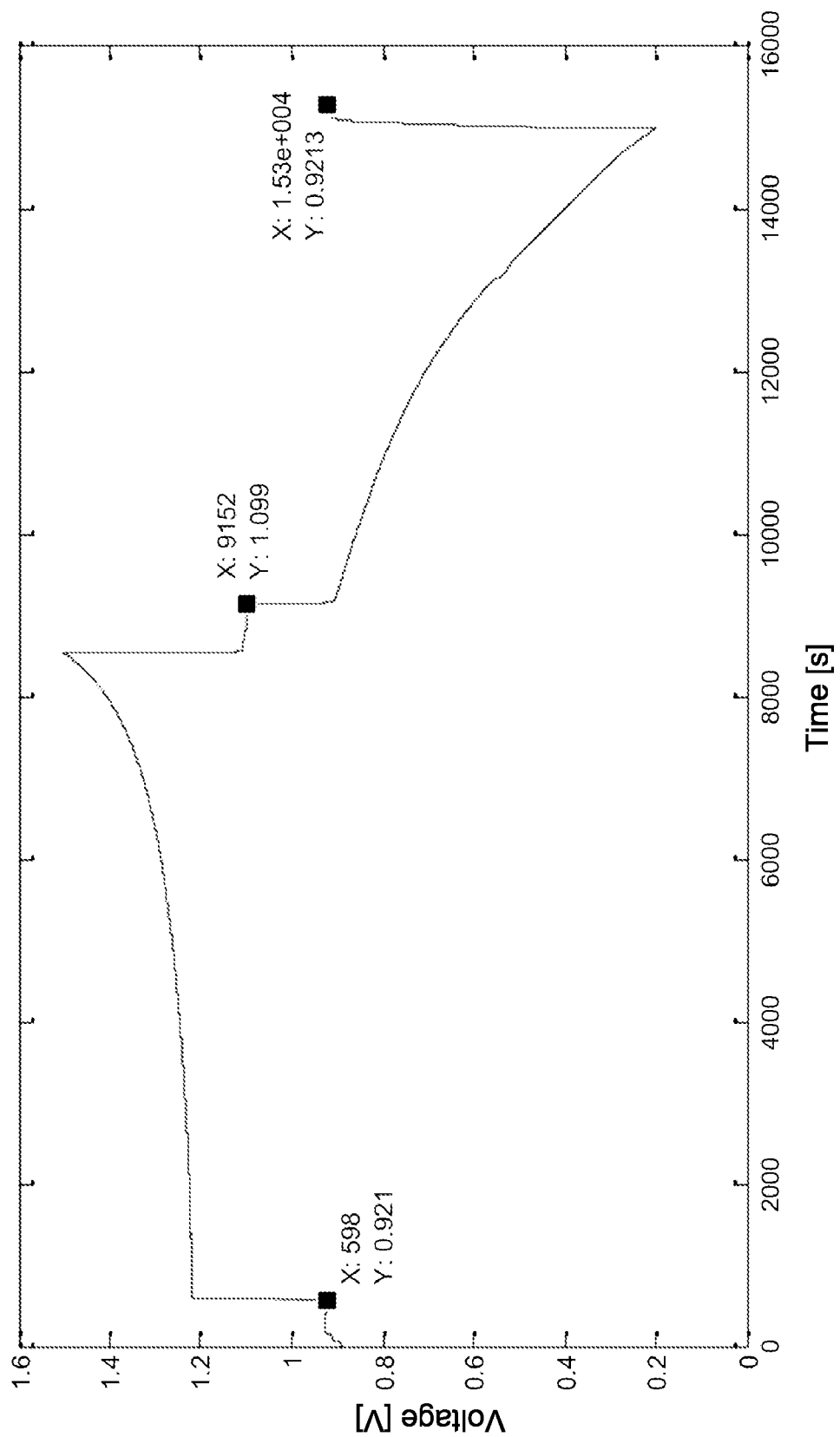
FIG. 2 is a charge/discharge curve for a vanadium/hydrogen regenerative fuel cell, using 0.23M vanadium.

FIG. 2 shows the charge discharge behaviour at a current density of 8 mA/cm². The system gives a smooth charge/discharge curve. The open circuit potential (OCV) for the vanadium/hydrogen system can be calculated from the Nernst equation (Equation 3).

$$E_{cell} = E^o_{cell} - \frac{RT}{F} \ln \frac{[VO^{2+}]}{[VO_2^+][H^+]P_{H_2}^{0.5}} \quad (3)$$

$$E^0 = E^0_{cell} - \frac{RT}{nF} \ln \left( \frac{[V(IV)][H_2O]}{[V(V)][H^+][H_2]^{\frac{1}{2}}} \right)$$

The reactions in the power delivery mode are:

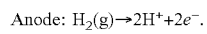
Anode: $H_2(g) \rightarrow 2H^+ + 2e^-$.

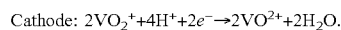
Cathode: $2VO_2^+ + 4H^+ + 2e^- \rightarrow 2VO^{2+} + 2H_2O$.

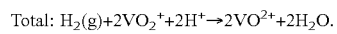
Total: $H_2(g) + 2VO_2^+ + 2H^+ \rightarrow 2VO^{2+} + 2H_2O$.

The OCV at the charged state for the cycle in FIG. 2 is 1.099 V. Using the Nernst equation, the percentage of V(V) species over V(IV) species was calculated as 99%. A higher concentration of V(V) species would be expected at the charged state and the high OCV would indicate a very high SOC. The OCV following discharge is 0.9213 V which corresponds to a V(V) concentration of 7%. The decreased V(V) concentration is expected as the solution is discharged, and the low concentration would indicate a deep discharge.

Charge/Discharge Cycle at 0.23M V(V)/V(IV) at Different Current Densities

Figure 3:
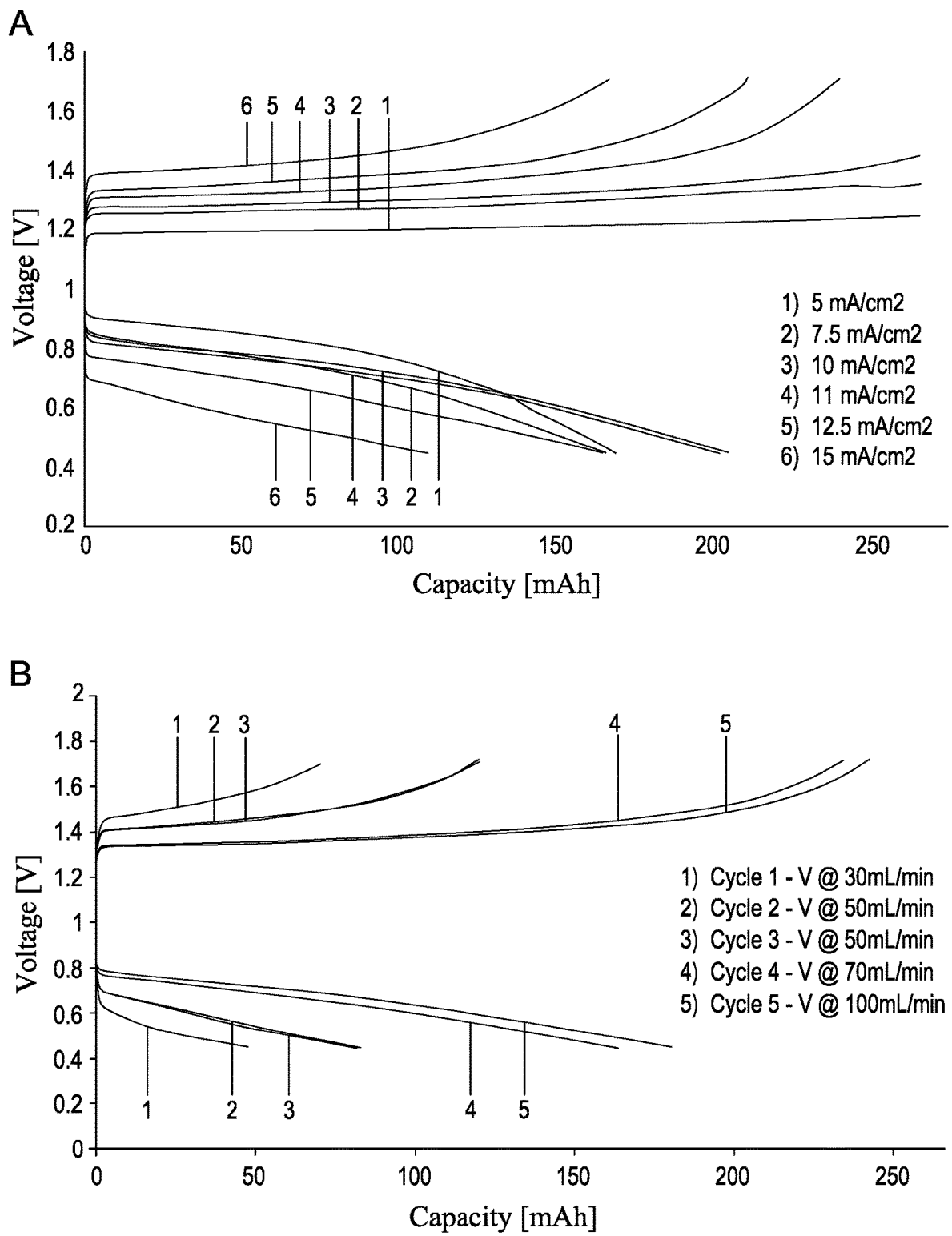
FIG. 3A shows charge/discharge curves for a vanadium/hydrogen regenerative fuel cell, using 0.23M vanadium at variable currently densities.
FIG. 3B shows charge/discharge curves for a vanadium/hydrogen regenerative fuel cell, using 0.23M vanadium at variable flow rates

The system was charged to a target capacity of 264 mAh, as this represented a 36% utilisation of the maximum theoretical capacity of 740 mAh. The hydrogen and vanadium flowrates were maintained at 50 mL/min throughout each cycle (FIG. 3A). From the results it was observed that the overpotential for both charge and discharge steps increased as the current density increased. Overpotentials are due to losses associated with Ohmic resistance, charge transfer and mass transport phenomena. At the start of each charge/discharge step the losses are most likely predominated by charge transfer processes while at the end it is mostly mass transport limitations that contribute to the overpotential.

Charge/Discharge Cycle at 0.23 M V(V)/V(IV) at Different Flow Rates

System parameters that affect the utilisation of redox species are current density, voltage window and electrolyte flow rate. It has been observed that as the current density increases, utilisation of electrolyte decreases. Current density also determines the operating power of the system. There is a trade-off between electrolyte utilisation and power output. The effect of vanadium flow rate on capacity utilisation was studied at a current density of 14 mA/cm$^2$ (FIG. 3B). The maximum power point at 75% SOC was chosen as it is assumed to be a good representative point for the system.

At a vanadium flow rate of 50 mL/min, the system had a capacity utilisation of 16.2% (see Table 1).

Decreasing the flow rate to 30 mL/min resulted in a decrease in capacity utilisation to 9.5%. However, increasing the flow rate to 70 mL/min resulted in an increase in the capacity utilisation to 31.6%. A 40% decrease in flow rate yielded a 41% decrease in the utilisation, while a 40% increase yielded a 95% increase in the utilisation. This shows the importance of mass transport and concentration polarisation losses to the system. Further increasing the flow rate to 100 mL/min marginally increased the capacity utilisation to 32.7%, and achieved higher efficiencies.

TABLE 1

Capacity utilisation for a wide range of vanadium flow rates

| Cycle Number [—] | Capacity Utilisation [%] |
|---|---|
| 1-30 mL/min | 9.5 |
| 2 & 3-50 mL/min | 16.2 |
| 4-70 mL/min | 31.6 |
| 5-100 mL/min | 32.8 |

Power Density for 0.23 M V(V)/V(IV) at a Flow Rate of 50 ml/min

Figure 4:
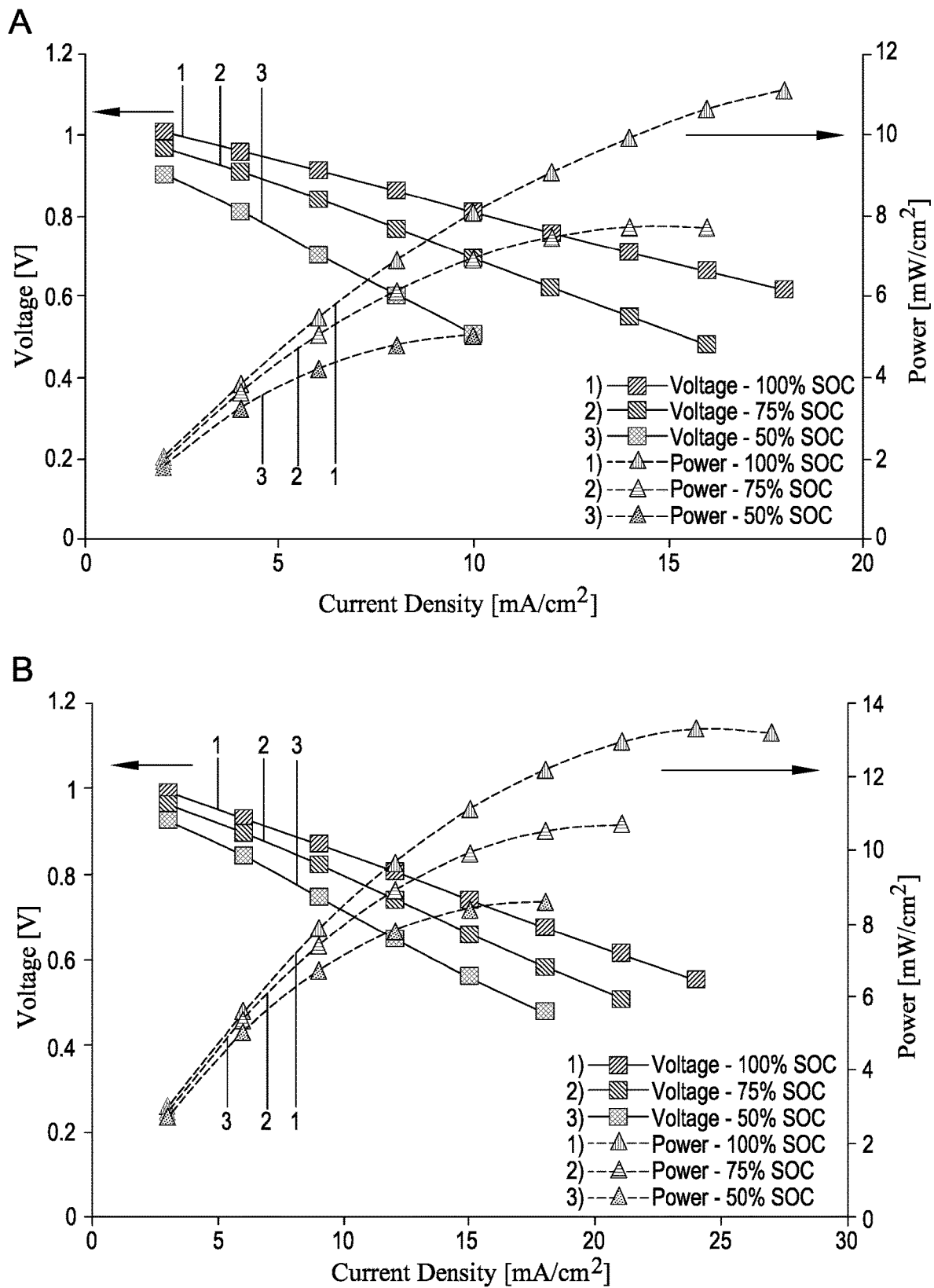
FIG. 4A shows a power density curve for a vanadium/hydrogen regenerative fuel cell, using 0.23M vanadium at a flow rate of 50 ml/min.
FIG. 4B shows a power density curve for a vanadium/hydrogen regenerative fuel cell, using 0.23M vanadium at a flow rate of 100 ml/min.

A power curve was measured for the system at a vanadium flow rate of 50 mL/min and at three states of charge (SOC) (FIG. 4A). For an SOC of 75% the system reached a maximum power point of 7.7 mW/cm$^2$ at a current density of 14 mA/cm$^2$.

Power Density for 0.23 M V(V)/V(IV) at a Flow Rate of 100 ml/min

The power curve was measured for a flow rate of 100 mL/min and at three different SOCs (FIG. 4B). At 100% SOC a maximum power point of 13.3 mW/cm$^2$ was reached at a current density of 24 mA/cm$^2$. At an SOC of 75% the maximum power reached was 10.7 mW/cm$^2$ at a current density of 21 mA/cm$^2$. This represents a 39% increase in the maximum power when compared with the power reached at a flow rate of 50 mL/min. Operating at higher vanadium flow rate improves system performance by reducing mass transport limitation and increasing capacity utilisation.

Power Density for 1.0 M V(V)/V(IV) at a Flow Rate of 100 ml/min

The concentration of vanadium was increased from 0.23 M to 1.0 M in order to investigate the effect of increasing the vanadium concentration, an important consideration for large-scale systems. A typical large-scale VRB system would have a vanadium concentration of 1.5-2.0 M. Solubility and precipitation of V$^{5+}$ becomes an issue at concentrations above 2.0 M. A 1.0 M solution was chosen as it is a substantial increase in the concentration from the original system and brought it closer to the 1.5 M concentration that would be used at large-scale.

Figure 5:
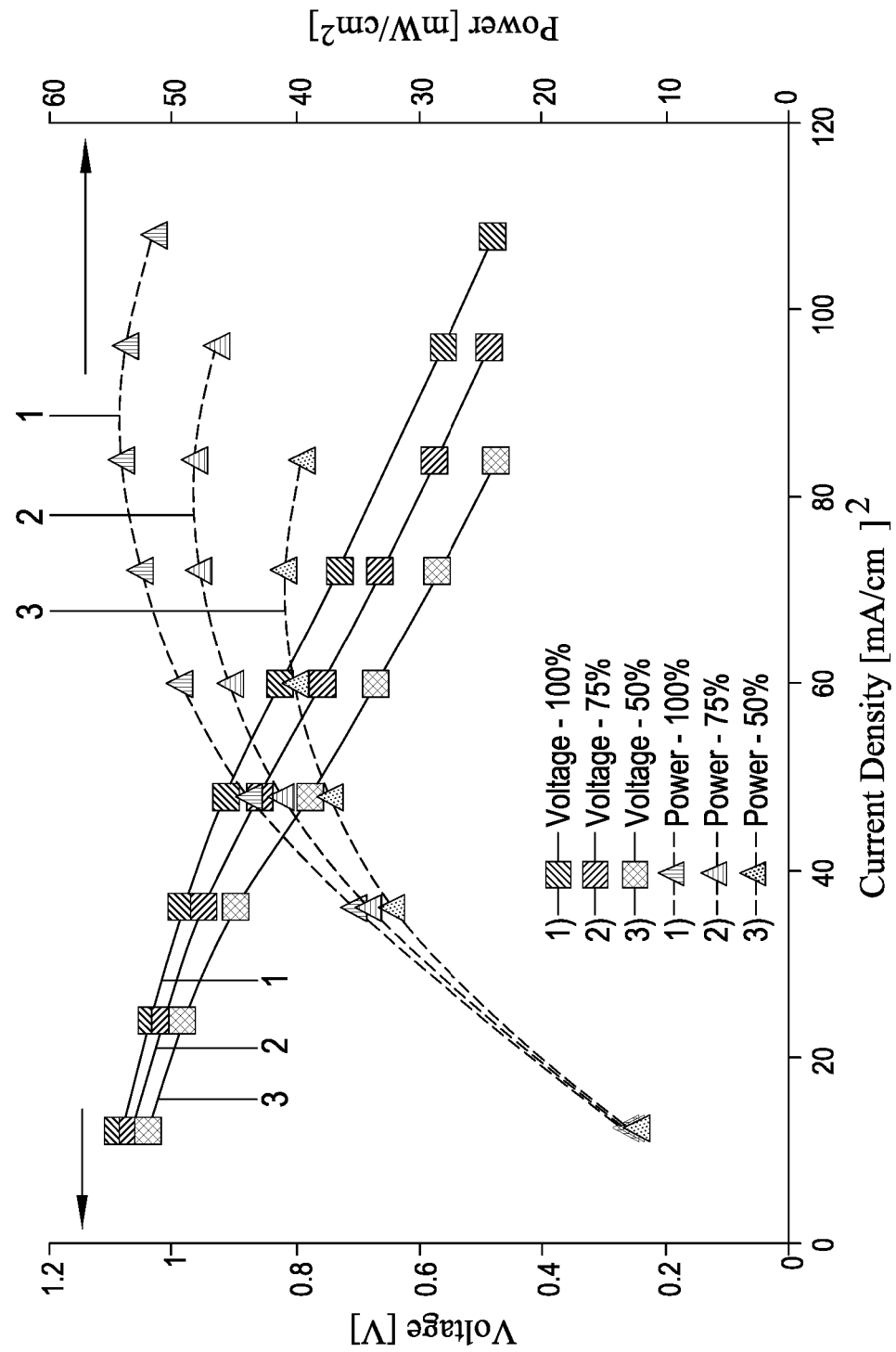
FIG. 5 shows a power density curve for a vanadium/hydrogen regenerative fuel cell, using 1.0 M vanadium at a flow rate of 100 ml/min; the graph shows a combined I-V curve (left) and a power curve (right).

The power curve for the 1.0 M system was measured at a vanadium flow rate of 100 mL/min and at SOCs of 100%, 75% and 50% (FIG. 5). The maximum power reached at 100% SOC was 54.3 mW/cm$^2$ at a current density of 84 mA/cm$^2$. The maximum power point for an SOC of 75% was also at a current density of 84 mA/cm$^2$ with a specific power of 48.4 mW/cm$^2$. If the maximum power point determined at 75% SOC for the 0.23 M system is scaled up linearly to 1.0 M, a power of 46.5 mW/cm$^2$ at a current density of 91 mA/cm$^2$ would be achieved. This indicates a remarkably linear relationship between maximum power and vanadium concentration. In this work we have found that our non-optimised RVFC has demonstrated surprisingly high power density comparing to current commercial VRB technology. For example the discharge power density of common VRB system with 2 M vanadium solution and average working voltage of 1.3 V is around 65 mW/cm$^2$ (Rychcik, M. and Skyllas-Kazacos, M., Journal of Power Sources, 1988, vol. 22, 56-67) or 32 mW/cm$^2$ for 1 M vanadium solution which is 40% less than that of our non-optimised RVFC. This result further reinforces the potential of an optimised RVFC system in terms of power output as compared with the current state-of-the-art all-vanadium systems.

An energy efficiency of 30.9% was achieved for the 1.0 M system, when run at a current density of 72 mA/cm$^2$ (just below the maximum power point) and vanadium flow rate of 100 mL/min. This compares with an energy efficiency of 33.5% for the 0.23 M system under similar conditions (Table 2). The 1.0 M solution has lower overall energy efficiency primarily due to its lower voltage efficiency; however, it does achieve higher coulombic efficiencies.

TABLE 2

Comparison of efficiencies for the 0.23M and 1.0M systems.

| Vanadium Concentration [M] | Coulombic [%] | Efficiency Voltage [%] | Energy [%] |
|---|---|---|---|
| 0.23M | 74.2 | 45.1 | 33.5 |
| 1.0M | 86.2 | 35.9 | 30.9 |

Example 2: Manganese Cell

Unless stated otherwise, the experimental setup as described above was used for manganese RFC experiments.

The methods to characterise manganese RFCs such as charge and discharge cycles and power curve measurements were also the same. Discharge cut-off voltages were 0.5 V while charging was stopped at 1.8 V.

Preparation of Manganese Sulphate Solution

Manganese catholyte solutions of 0.2 M and 0.5 M were prepared by dissolving corresponding amounts of manganese carbonate (Sigma-Aldrich) in concentrated sulphuric acid. Upon adding manganese carbonate, $CO_2$ is released facilitating metal solubility. Sulphuric acid concentration is adjusted to reach concentration of 3M or 5M. A Masterflex easy-load peristaltic pump and Masterflex Chem-Durance tubing were used to pump the vanadium catholyte through the cell.

Figure 6:
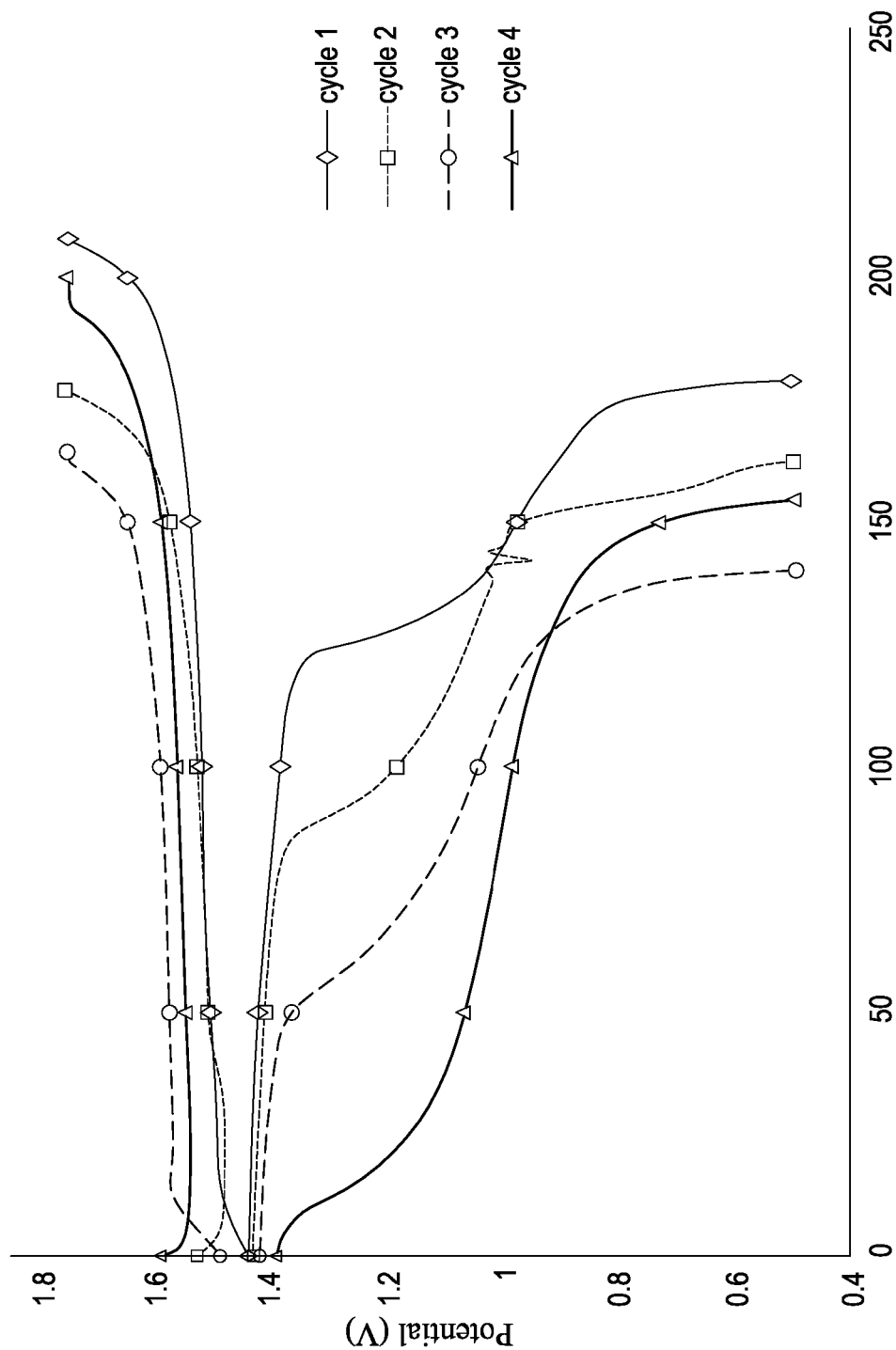
FIG. 6 shows charge/discharge curves for a manganese/hydrogen regenerative fuel cell, using 0.2 M $MnSO_4$ in 5 M $H_2SO_4$ at a flow rate of 50 ml/min and current density of 20 mA/cm$^2$, over four cycles.

Electrochemical Reactions During Discharge:

Cathode: $2Mn^{3+} + 2e^- \rightarrow 2Mn^{2+}$   $E^{\ominus}_{Mn2+} = 1.51\ V$ Anode: $H_2 \rightarrow 2H^+ + 2e^-$   $E^{\ominus}_{anode} = 0V$ Overall $2Mn^{3+} + H_2 \rightarrow 2H^+ \pm 2Mn^{2+}$   $E^{\ominus}_{overall} = 1.51\ V$ System Testing Standard Mn Electrolyte (No Additive): Cycle Efficiency FIG. 6 shows charge/discharge curves for a manganese/hydrogen regenerative fuel cell, using 0.2 M $MnSO_4$ in 5 M $H_2SO_4$ at a flow rate of 50 ml/min and current density of 20 $mA/cm^2$, over four cycles.

The Coulombic, voltage and energy efficiency for each cycle are summarized below in Table 3.

TABLE 3

Comparison of Coulmbic, voltage and energy efficiency of 0.2M manganese system over four cycles.

| | Coulombic efficiency | Voltage efficiency | Energy efficiency |
|---|---|---|---|
| cycle 1 | 86% | 83% | 72% |
| cycle 2 | 81% | 78% | 66% |
| cycle 3 | 87% | 66% | 58% |
| cycle 4 | 86% | 74% | 64% |

Standard Mn Electrolyte (No Additive): Current Density

Figure 7:
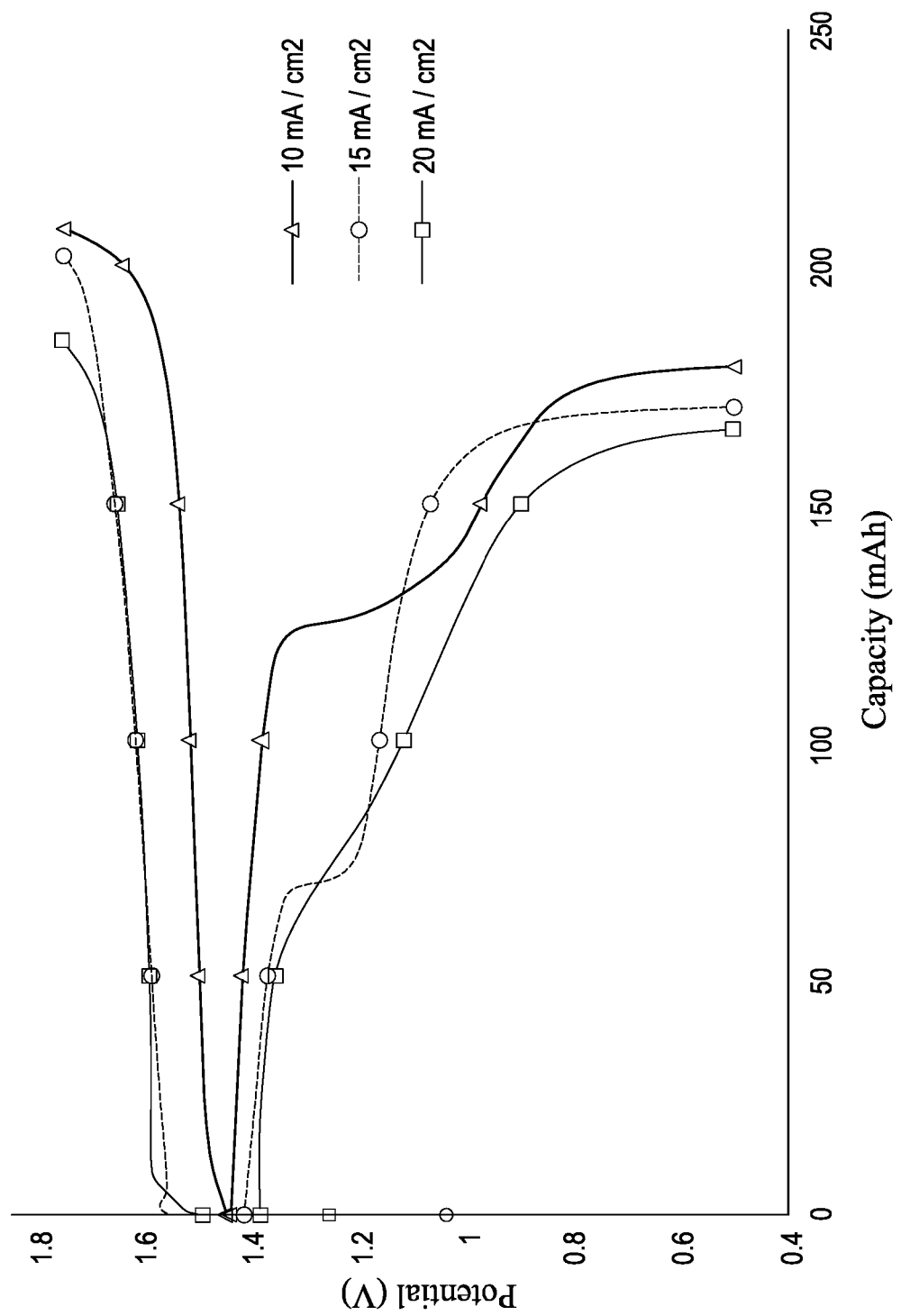
FIG. 7 shows charge/discharge curves for a manganese/hydrogen regenerative fuel cell, using 0.2 M $MnSO_4$ in 5 M $H_2SO_4$ at a flow rate of 50 ml/min, at variable current densities.

FIG. 7 shows charge/discharge curves for a manganese/hydrogen regenerative fuel cell, using 0.2 M $MnSO_4$ in 5 M $H_2SO_4$ at a flow rate of 50 ml/min, at variable current densities.

The Coulombic, voltage and energy efficiency at different current densities are summarized below in Table 4.

TABLE 4

Comparison of Coulmbic, voltage and energy efficiency of 0.2M manganese system at different current densities.

| Current density | Coulombic efficiency | Voltage efficiency | Energy efficiency |
|---|---|---|---|
| 10 $mA/cm^2$ | 86.6% | 83.1% | 71.9% |
| 15 $mA/cm^2$ | 85.0% | 74.9% | 63.6% |
| 20 $mA/cm^2$ | 90.9% | 72.3% | 65.8% |

Standard Mn Electrolyte (No Additive): Flow Rate

Figure 8:
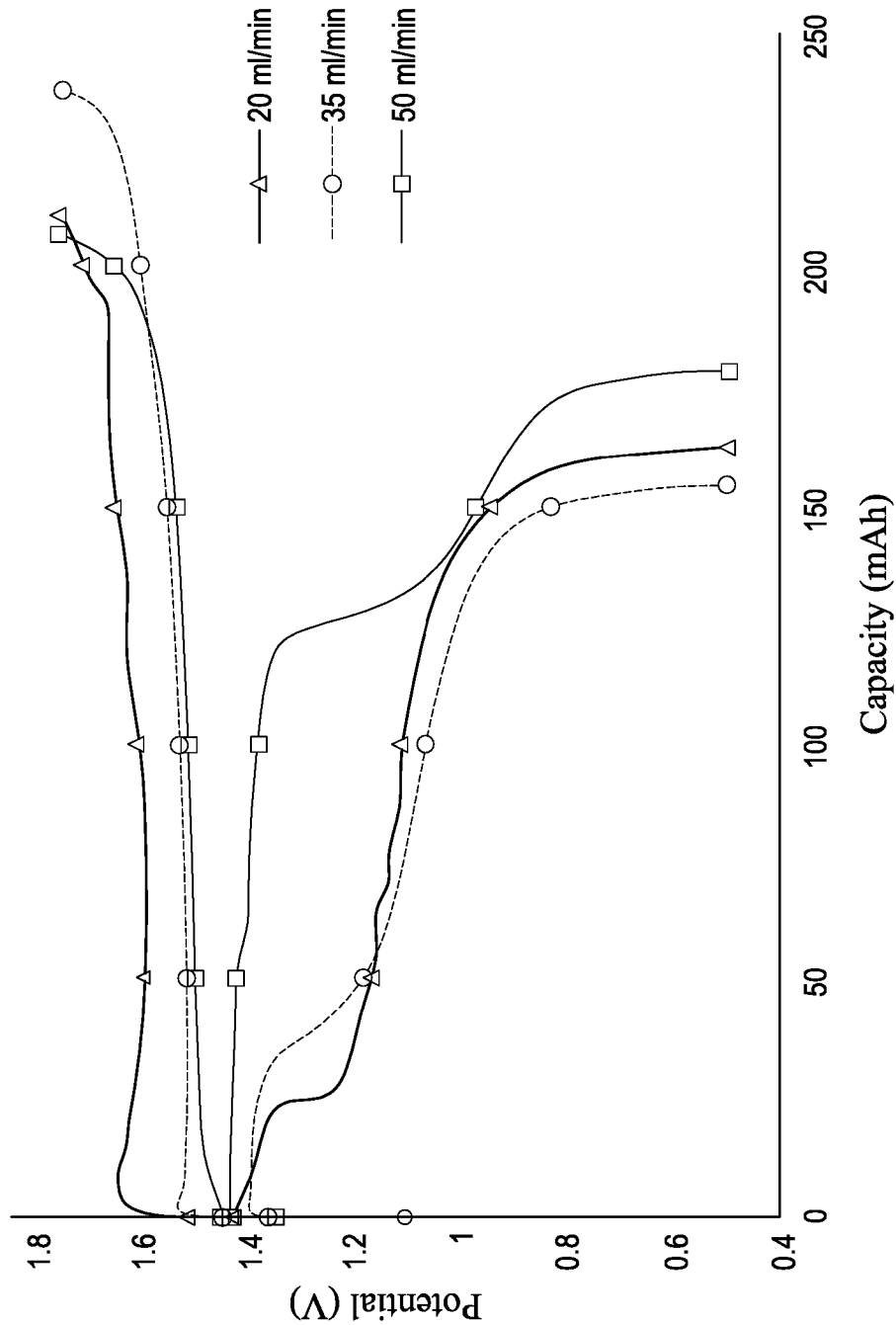
FIG. 8 shows charge/discharge curves for a manganese/hydrogen regenerative fuel cell, using 0.2 M $MnSO_4$ in 5 M $H_2SO_4$ and a current density of 20 mA/cm$^2$ at variable flow rates.

FIG. 8 shows charge/discharge curves for a manganese/hydrogen regenerative fuel cell, using 0.2 M $MnSO_4$ in 5 M $H_2SO_4$ at a current density of 20 $mA/cm^2$ at variable flow rates.

TABLE 5

Comparison of Coulmbic, voltage and energy efficiency of 0.2M manganese system at different flow rates.

| Flow rate | Coulombic efficiency | Voltage efficiency | Energy efficiency |
|---|---|---|---|
| 20 mL/min | 77.7% | 69.5% | 54.0% |
| 35 mL/min | 64.9% | 73.0% | 47.4% |
| 50 mL/min | 86.6% | 83.0% | 71.9% |

Standard Mn Electrolyte (No Additive): Power Curve

Figure 9:
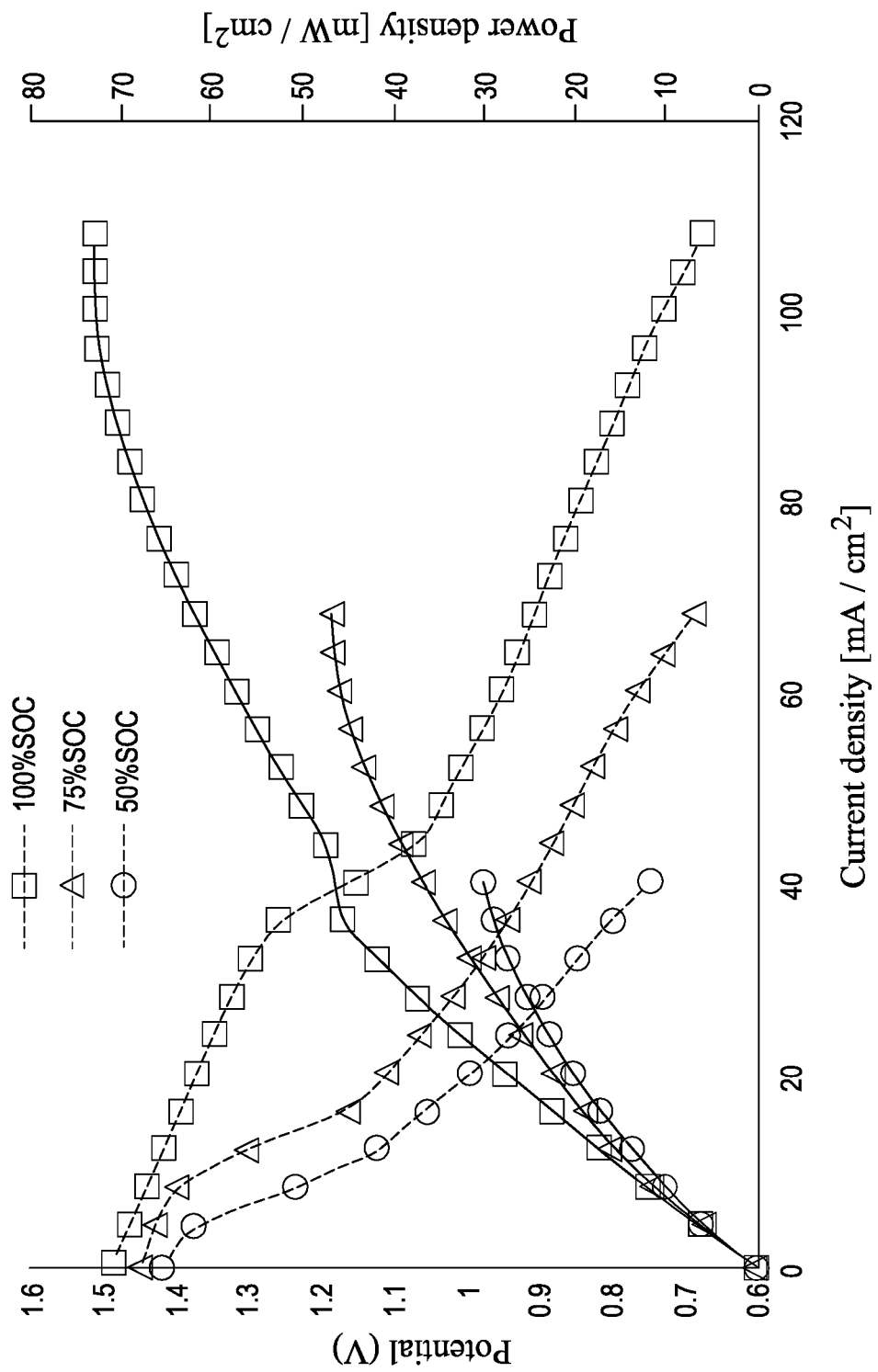
FIG. 9 shows a power density curve for a manganese/hydrogen regenerative fuel cell, using 0.2 M $MnSO_4$ in 5 M $H_2SO_4$ at a flow rate of 50 ml/min and 0.001 A/s, 20 s/p, at varying states of charge.

FIG. 9 shows a power density curve for a manganese/hydrogen regenerative fuel cell, using 0.2 M $MnSO_4$ in 5 M $H_2SO_4$ at a flow rate of 50 ml/min at a scan rate of 0.001 A/s with 20 s/point, at varying states of charge.

Example 3: Manganese Cell with Additives

A similar experimental setup and series of experiments as above were performed to characterise regenerative manganese fuel cells with additives.

Unless stated otherwise, the experimental setup as described above was used for manganese RFC with additive experiments.

The methods to characterise manganese RFCs such as charge and discharge cycles and power curve measurements were also the same. Discharge cut-off voltages were 0.5 V while charging was stopped at 1.8 V.

Preparation of Manganese Sulphate/Titanium Sulphate Solution

Additive solutions of 0.2 M to 1.5 M were prepared by dissolving a suitable precursor in concentrated sulphuric acid. Manganese catholyte solutions of 0.2 M and 0.5 M were prepared by dissolving corresponding amounts of manganese carbonate (Sigma-Aldrich) in concentrated sulphuric acid. Upon adding manganese carbonate, $CO_2$ is released facilitating metal solubility. Sulphuric acid concentration is adjusted to reach concentration of 3M or 5M.

A Masterflex easy-load peristaltic pump and Masterflex Chem-Durance tubing were used to pump the vanadium catholyte through the cell.

System Testing

Optimised Mn Electrolyte (with Ti(IV) Additive): Cycle Efficiency

Figure 10:
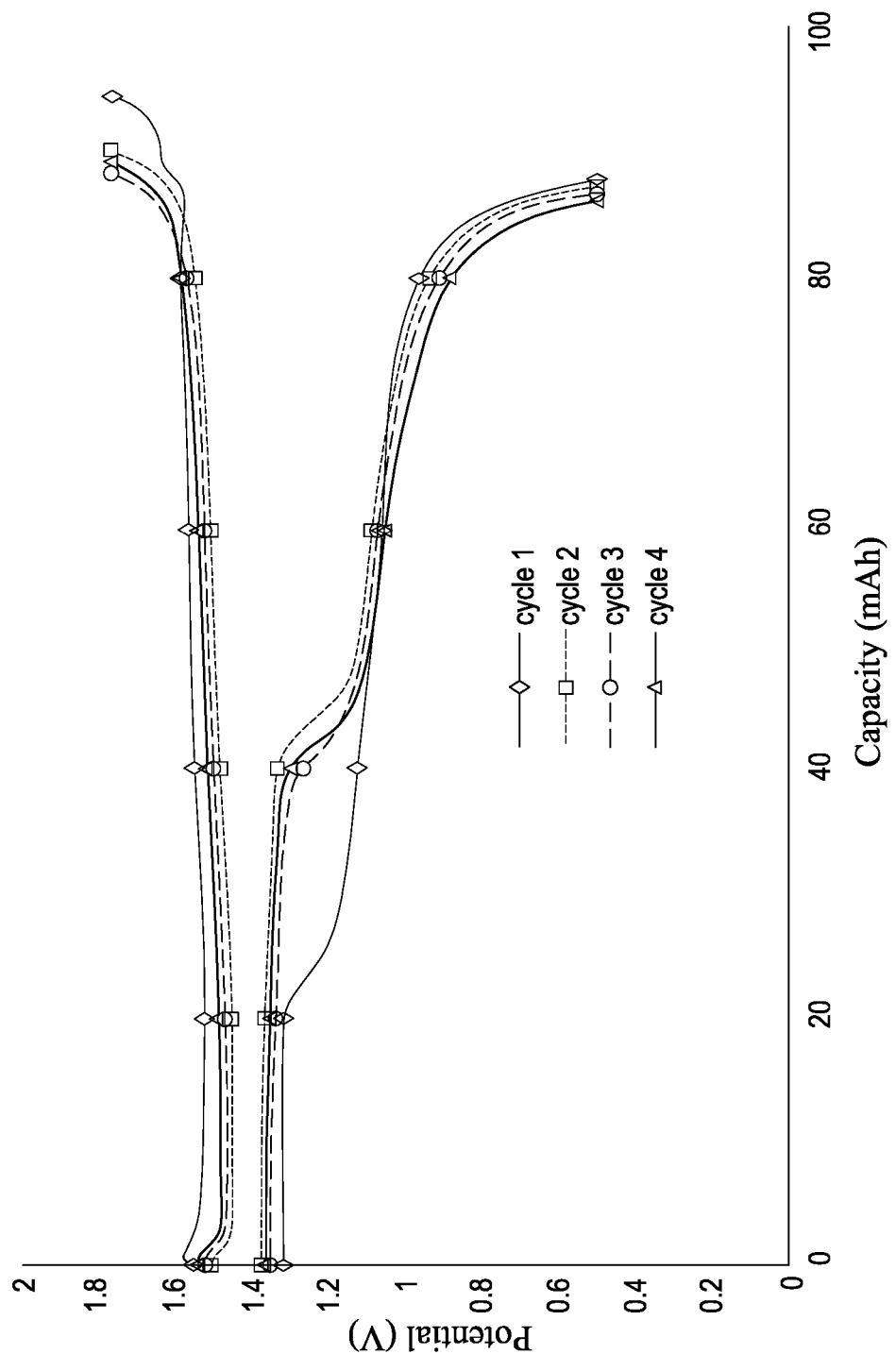
FIG. 10 shows charge/discharge curves for a manganese/hydrogen regenerative fuel cell, using 0.2 M $MnSO_4$ with 0.2 M $Ti(SO_4)_2$ in 5 M $H_2SO$ at a flow rate of 50 ml/min, over four cycles.

FIG. 10 shows charge/discharge curves for a manganese/hydrogen regenerative fuel cell, using 0.2 M $MnSO_4$ with 0.2 M $Ti(SO_4)_2$ in 5 M $H_2SO$ at a flow rate of 50 ml/min, over four cycles.

TABLE 6

Comparison of Coulmbic, voltage and energy efficiency of 0.2M manganese system with 0.2M Ti(IV) additive over four cycles.

| | Coulombic efficiency | Voltage efficiency | Energy efficiency |
|---|---|---|---|
| cycle 1 | 92.7% | 72.3% | 67.0% |
| cycle 2 | 96.9% | 77.8% | 75.4% |
| cycle 3 | 98.1% | 76.5% | 75.1% |
| cycle 4 | 96.9% | 76.2% | 73.9% |

Optimised Mn Electrolyte (with Ti(IV) Additive): Current Density

Figure 11:
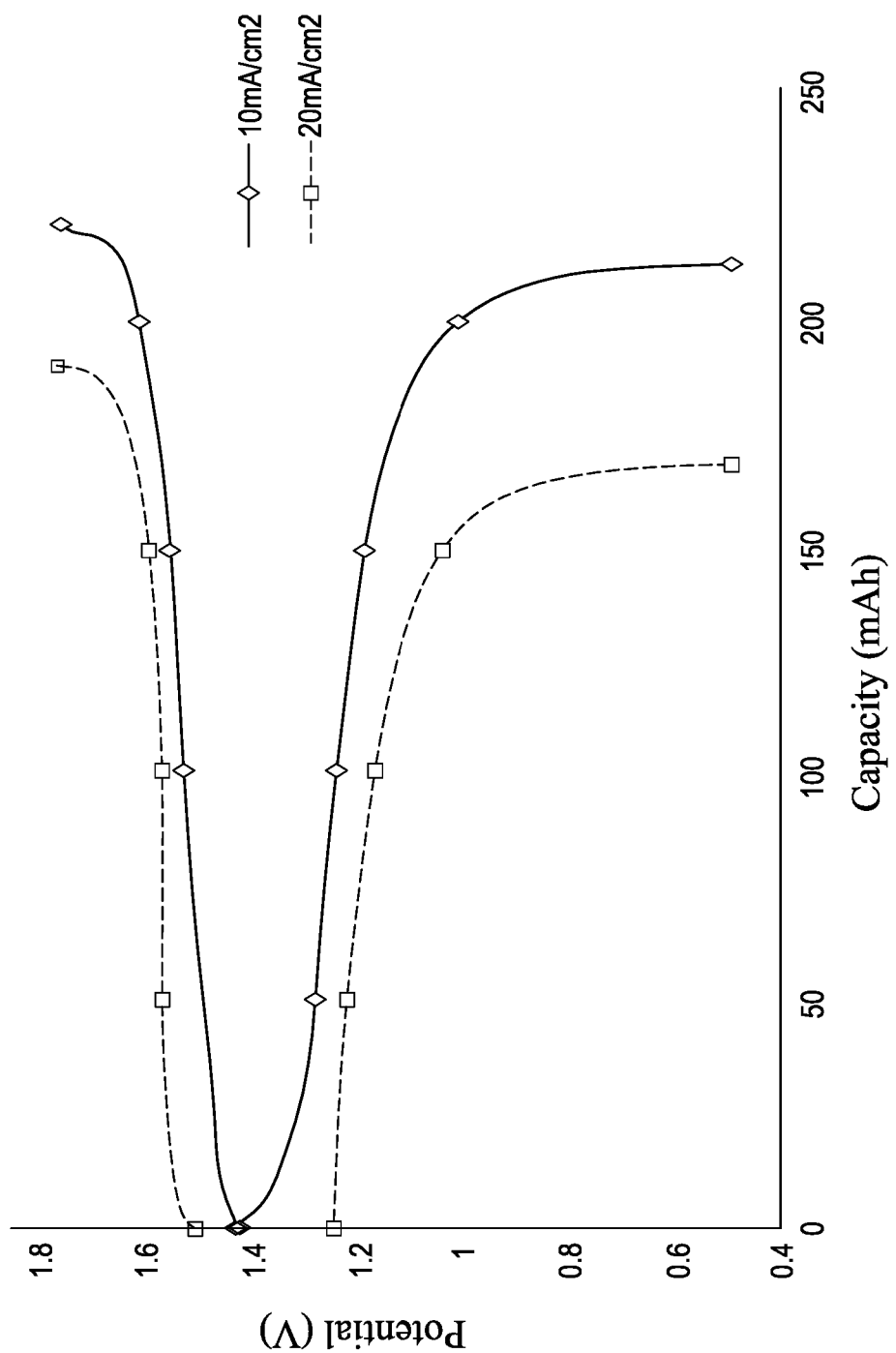
FIG. 11 shows charge/discharge curves for a manganese/hydrogen regenerative fuel cell, using 0.2 M $MnSO_4$ with 0.2 M $Ti(SO_4)_2$ in 5 M $H_2SO_4$ at a flow rate of 50 ml/min, at variable current densities.

FIG. 11 shows charge/discharge curves for a manganese/hydrogen regenerative fuel cell, using 0.2 M $MnSO_4$ with 0.2 M $Ti(SO_4)_2$ in 5 M $H_2SO_4$ at a flow rate of 50 ml/min, at variable current densities.

TABLE 7

Comparison of Coulmbic, voltage and energy efficiency of 0.2M manganese system with 0.2M Ti(IV) additive at different current densities.

| Current density | Coulombic efficiency | Voltage efficiency | Energy efficiency |
|---|---|---|---|
| 10 mA/cm$^2$ | 97.3% | 78.7% | 76.6% |
| 20 mA/cm$^2$ | 88.6% | 72.7% | 64.4% |

Optimised Mn Electrolyte (with Ti(IV) Additive): Manganese Concentration

Figure 12:
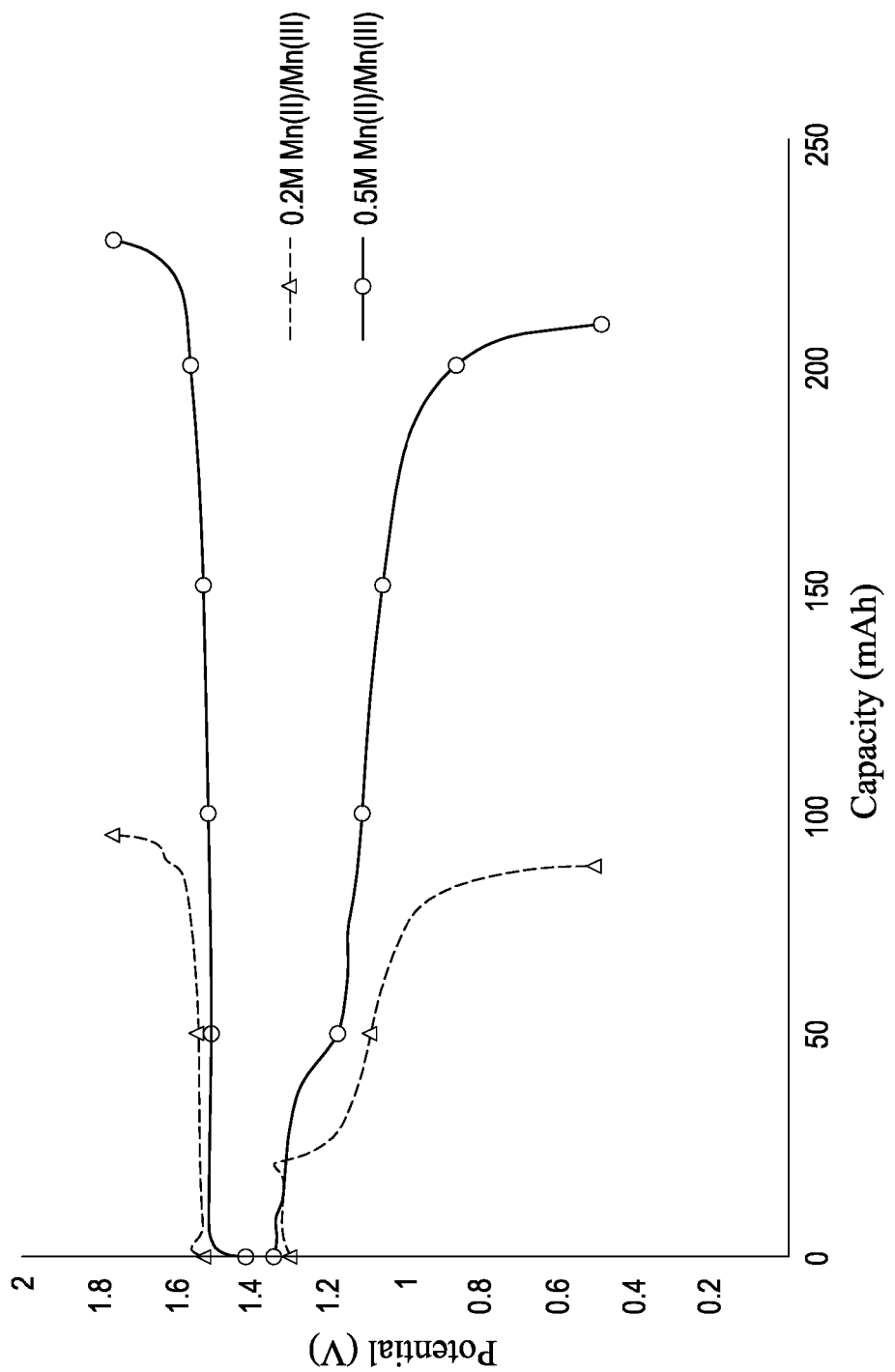
FIG. 12 shows charge/discharge curves for a manganese/hydrogen regenerative fuel cell, using 0.2 M $Ti(SO_4)_2$ in 5 M $H_2SO_4$ at a flow rate of 50 ml/min and current density of 20 mA/cm$^2$ at variable manganese concentrations.

FIG. 12 shows charge/discharge curves for a manganese/hydrogen regenerative fuel cell, using 0.2 M Ti(SO$_4$)$_2$ in 5 M H$_2$SO$_4$ at a flow rate of 50 ml/min and current density of 20 mA/cm$^2$ at variable manganese concentrations.

TABLE 8

Comparison of Coulmbic, voltage and energy efficiency of 0.2M manganese system with 0.2M Ti(IV) additive at different manganese concentrations.

| | Coulombic efficiency | Voltage efficiency | Energy efficiency |
|---|---|---|---|
| 0.2M Mn(II)/Mn(III) | 92.7% | 72.3% | 67.0% |
| 0.5M Mn(II)/Mn(III) | 91.9% | 72.7% | 66.8% |

Figure 13:
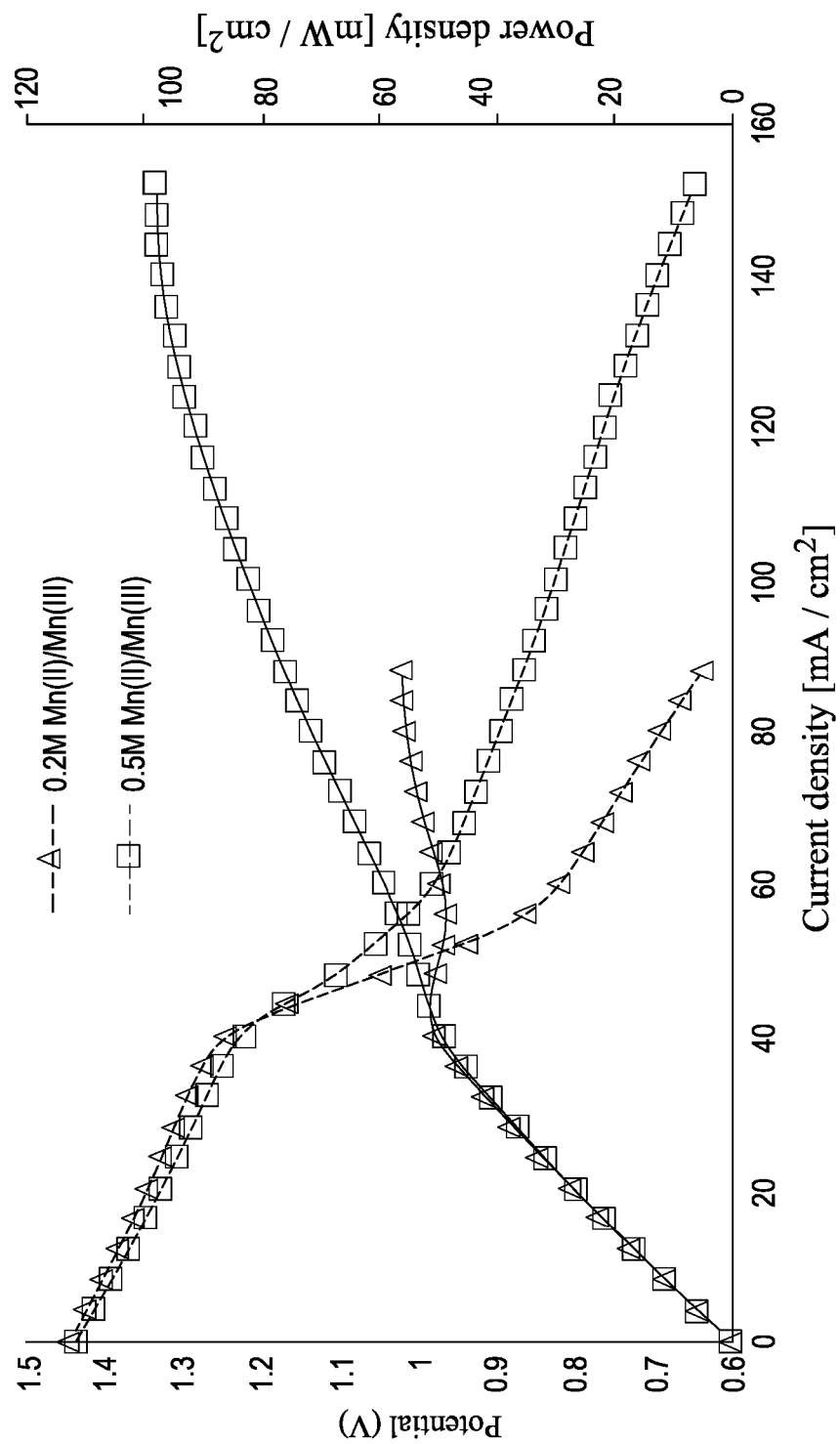
FIG. 13 shows power density curves for a manganese/hydrogen regenerative fuel cell using 0.2 M $Ti(SO_4)_2$ in 5 M $H_2SO_4$ at different manganese concentrations, at a flow rate of 50 ml/min at a scan rate of 0.001 A/s with 20 s/point.

FIG. 13 shows power density curves for a manganese/hydrogen regenerative fuel cell at different manganese concentrations using, 5 M H$_2$SO$_4$ at a flow rate of 50 ml/min at a scan rate of 0.001 A/s with 20 s/point.

Optimised Mn Electrolyte (with Ti(IV) Additive): Acid Concentration

Figure 14:
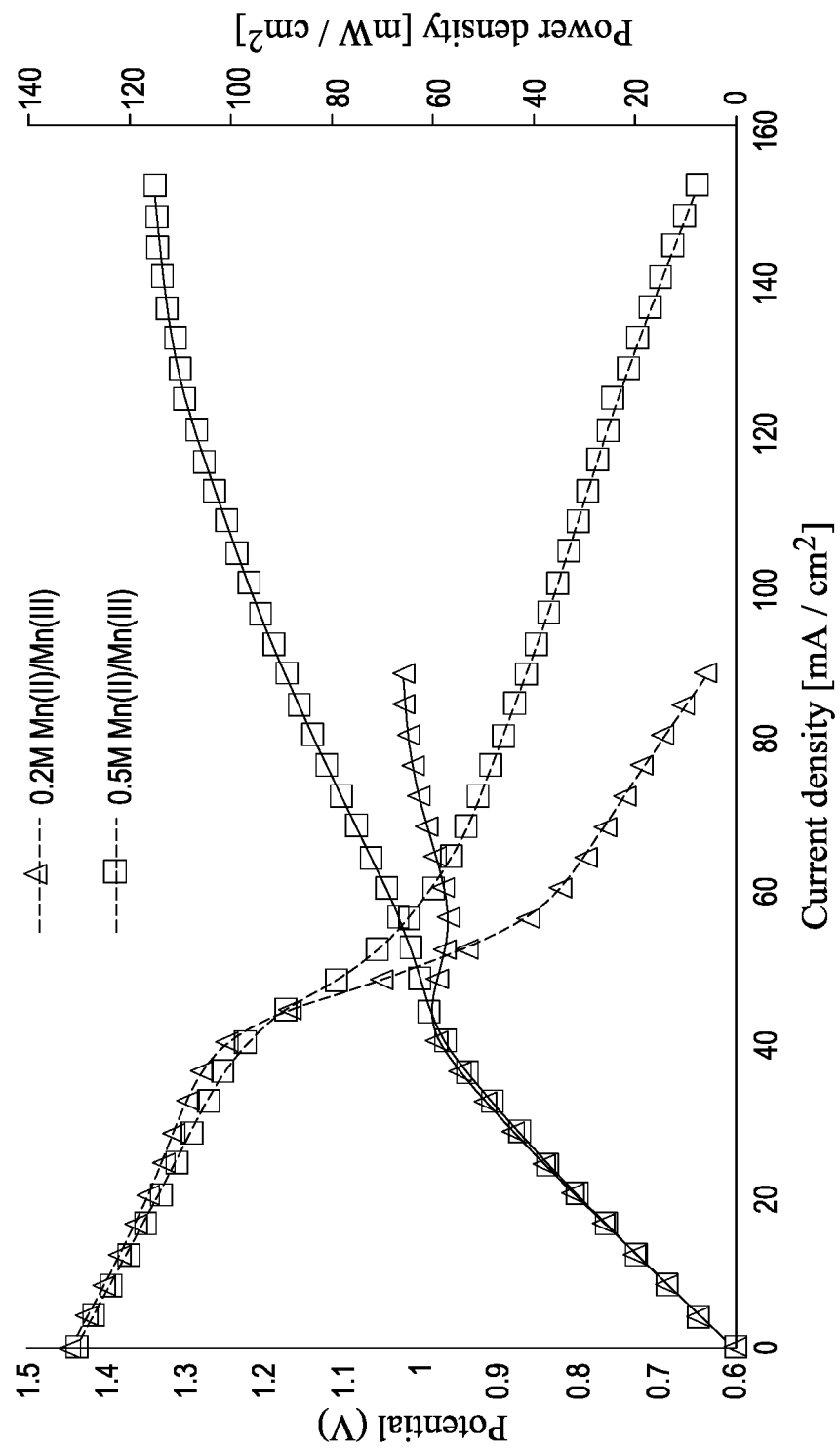
FIG. 14 shows power density curves for a manganese/hydrogen regenerative fuel cell at different acid concentrations using 0.2 M $MnSO_4$ and 0.2 M $Ti(SO_4)_2$ at a flow rate of 50 ml/min at a scan rate of 0.001 A/s with 20 s/point.

FIG. 14 shows power density curves for a manganese/hydrogen regenerative fuel cell at different acid concentrations using 0.2 M Mn at a flow rate of 50 ml/min at a scan rate of 0.001 A/s with 20 s/point.

Optimised Mn Electrolyte (with Ti(IV) Additive): State of Charge

Figure 15:
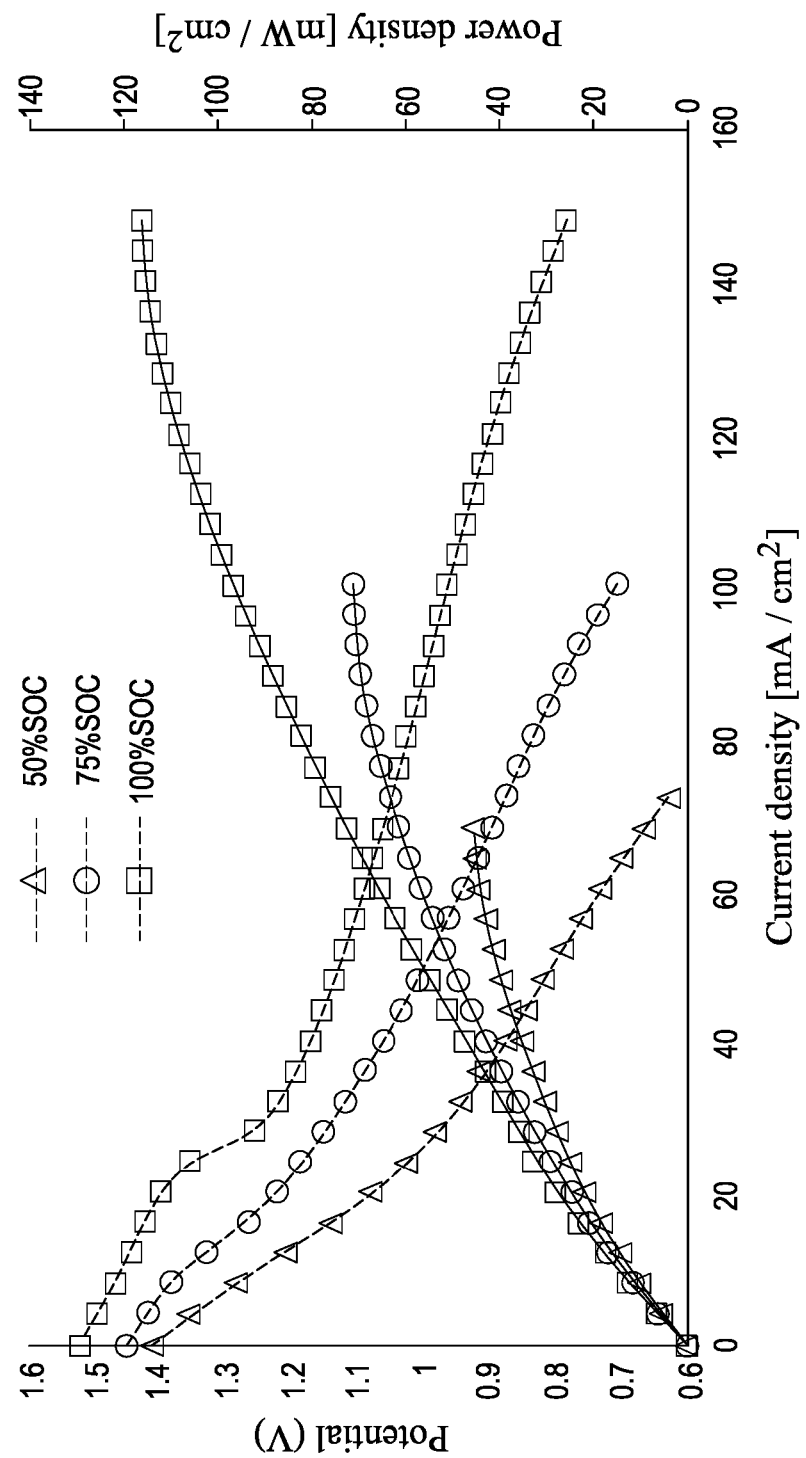
FIG. 15 shows power density curves for a manganese/hydrogen regenerative fuel cell using 0.2 M $MnSO_4$ and 0.2 M $Ti(SO_4)_2$ in 5 M $H_2SO_4$ at a flow rate of 50 ml/min, at a scan rate of 0.001 A/s with 20 s/point at varying states of charge.

FIG. 15 shows power density curves for a manganese/hydrogen regenerative fuel cell at using 0.2 M Mn in 5 M H$_2$SO$_4$ at a flow rate of 50 ml/min at a scan rate of 0.001 A/s with 20 s/point at varying states of charge.

Effect of Ti$^{4+}$ on Capacity Loss and Precipitation of MnO$_2$

Figure 17:
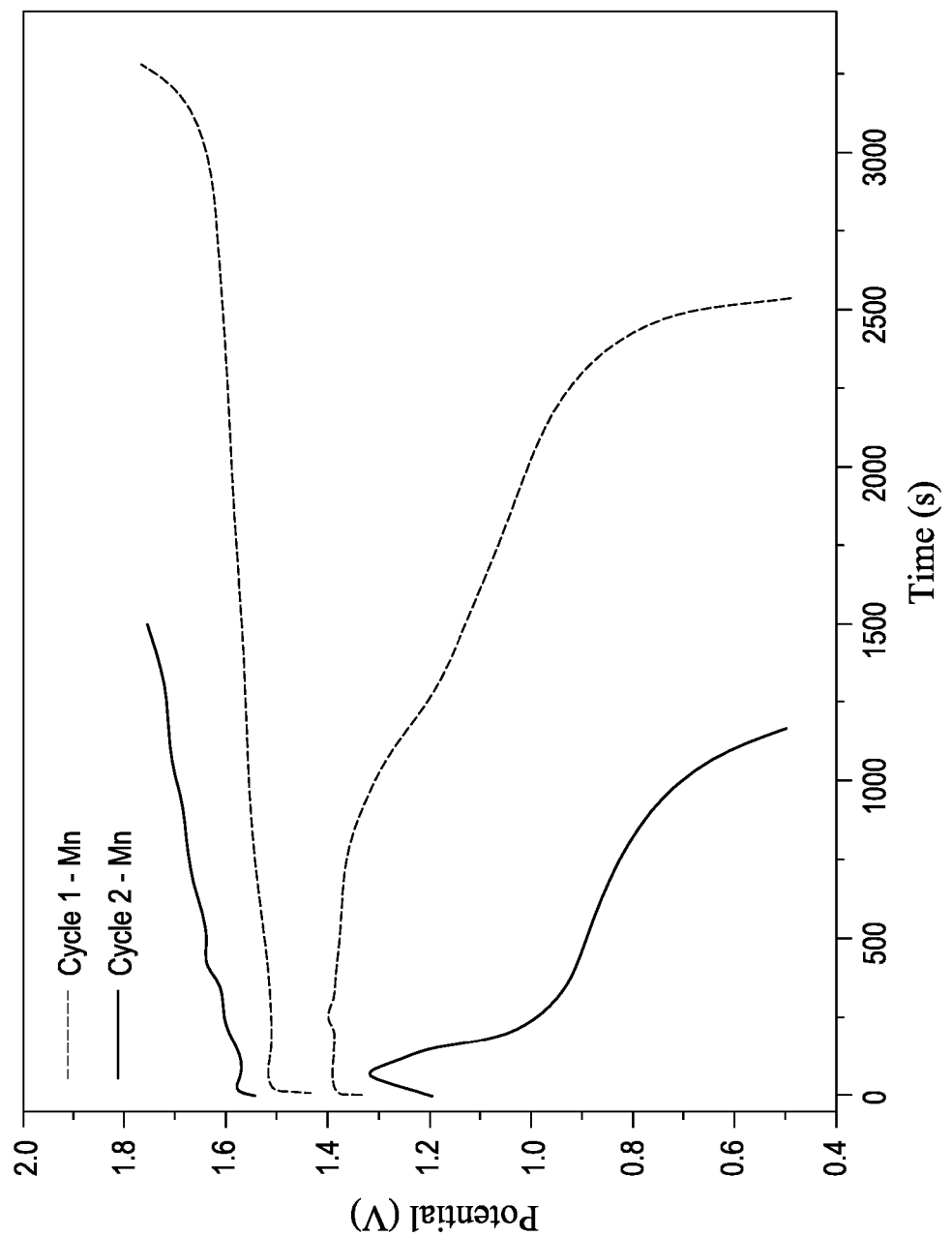
FIG. 17 shows charge and discharge curves for a manganese/hydrogen regenerative fuel cell at a current density of 20 mA/cm$^2$ using 0.2 M $MnSO_4$ in 3 M $H_2SO_4$.

FIG. 17 shows charge and discharge curves for a manganese/hydrogen regenerative fuel cell at a current density of 20 mA/cm$^2$ using 0.2 M MnSO$_4$ in 3 M H$_2$SO$_4$. Once fully charged, there was a pause of 10 min before starting the discharge. It can be seen that there was a large drop in capacity between first and second cycles. MnO$_2$ precipitation was evident, and believed to be the primary cause for loss in capacity.

Figure 18:
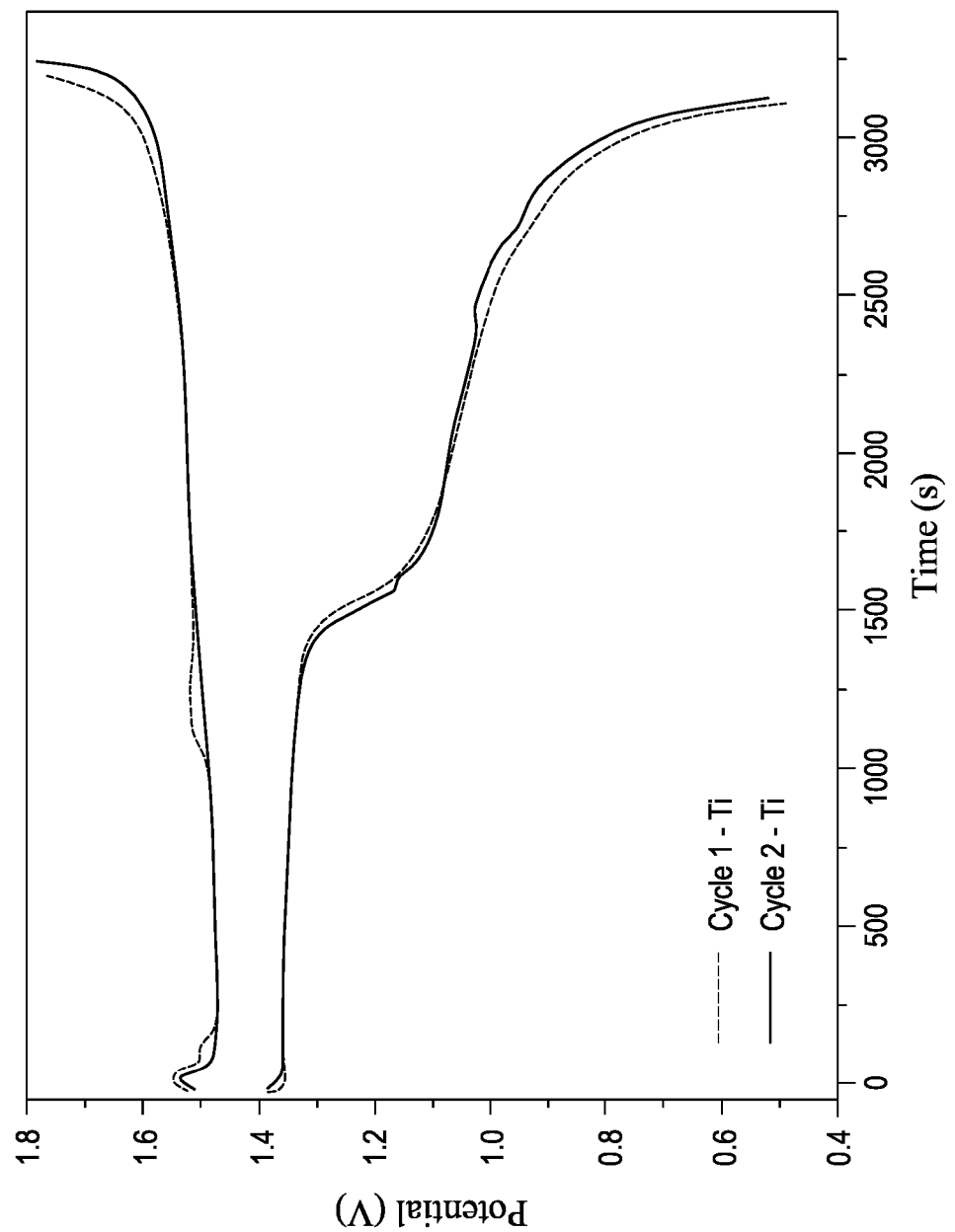
FIG. 18 shows charge and discharge curves for a manganese/hydrogen regenerative fuel cell at a current density of at 20 mA/cm$^2$ using 0.2 M $MnSO_4$ and 0.2 M $Ti(SO_4)_2$ in 3 M $H_2SO_4$.

FIG. 18 shows charge and discharge curves for a manganese/hydrogen regenerative fuel cell at a current density of at 20 mA/cm$^2$ using 0.2 M MnSO$_4$ and 0.2 M Ti(SO$_4$)$_2$ in 3 M H$_2$SO$_4$. Once fully charged, there was a pause of 10 min before starting the discharge. Clearly, there is little or no loss in capacity between cycles. There was no evidence of precipitation of solid, even keeping the liquid fully charged for 12 hours. Clearly, the solution is stabilised by the presence of Ti$^{4+}$, and capacity is retained between cycles.

Figure 16:
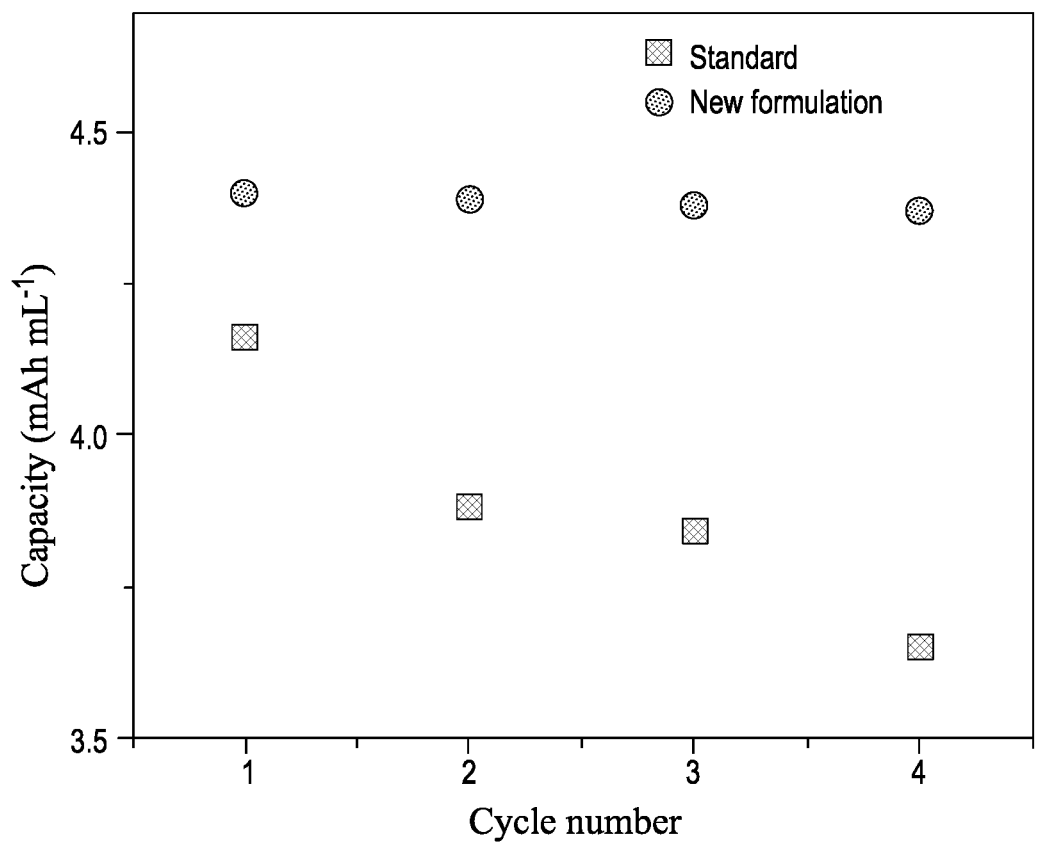
FIG. 16 shows a comparsion of capacity retention of a manganese/hydrogen regenerative fuel cell with and without Ti(IV) present.

FIG. 16 shows a comparsion of capacity retention of a manganese/hydrogen regenerative fuel cell with 0.2 M MnSO$_4$, with and without 0.2 M Ti(SO$_4$)$_2$ in 5 M H$_2$SO$_4$ over four cycles. Again the greatly improved capacity retention when titanium is present is clear. This is due to the improved stability of the solution (i.e. reduction in MnO$_2$ precipitation).

Further Discussion

Vanadium-(V) state exhibits a rich aqueous chemistry with metal complex structures that depends on the pH and vanadium concentration. In vanadium RFCs or Rebdox Flow Batteries (RFBs) VO$_2^+$ is produced at the positive electrode during battery charge. This species tends to polymerize and precipitate as V$_2$O$_5$ if its concentration is above 1.5M. This behaviour is enhanced as temperature rises above 40 C. Formation of solid precipitates leads to irreversible degradation of the RFC/RFB as a result of capacity fade and cell clogging. Besides that, those vanadium solubility constraints lead to RFCs/RFBs with moderate-to-low energy density (10-15 Wh/L$^{-1}$).

Figure 19A:
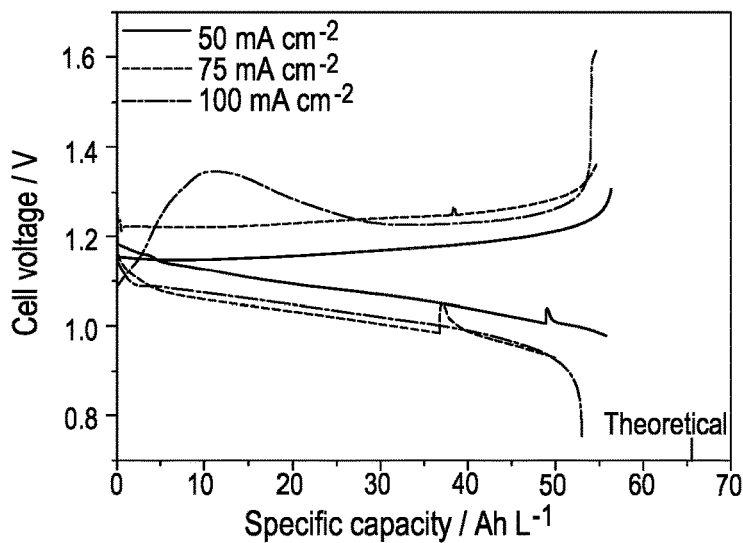
FIG. 19A shows Galvanostatic charge and discharge at 50, 75 and 100 mA cm$^{-2}$ of a $H_2$—V RFB using HCl as supporting electrolyte
Figure 19B:
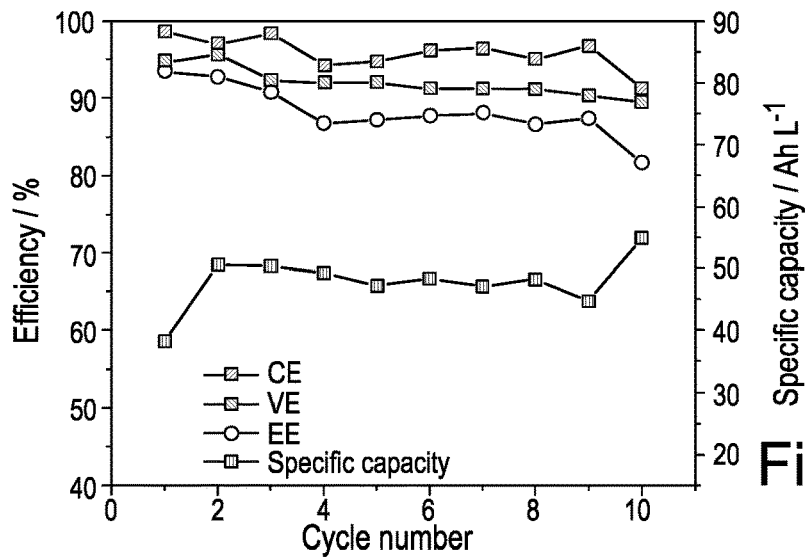
FIG. 19B shows Coulombic efficiency, voltage efficiency, energy efficiency and specific capacity upon galvanostic charge and discharge at 75 mA cm$^2$. Electrolyte 2.5M $VOSO_4$ in 6M HCl. Liquid flow rate 50 mL min$^{-1}$. Gas flow rate: 100 mL min$^{-1}$.

Recently, utilization of Cl$^-$ ligands and HCl as supporting electrolyte as a strategy to achieve high V(V) concentration and stability has been reported. While such catholyte formulation was successfully implemented in an all-vanadium RFB (liquid-liquid configuration), no reports on H2-Vanadium systems are available in the literature. Moreover, the implementation of HCl as supporting electrolyte is recommended due to halide crossover to the gas side which causes corrosion of the hydrogen evolution and oxidation catalyst (normally Pt). This effect has been widely reported for H2-Br systems as well as in the chlor-alkali industry. To our surprise, the utilization of an electrolyte made of 2.5M VOSO4 in 6M HCl as positive electrolyte in a H2-Vanadium system using a Platinum Black—Carbon Paper Electrode anode (Fuel Cell Store, 0.5 mgPt cm-2 loading), a Nafion 117 membrane and SGL Sigracet graphite felt cathode yielded and excellent performance. FIG. 19A shows galvanostic charge and discharge of the system using different current densities, 50, 75 and 100 mA cm$^{-2}$ respectively. The longer term charge and discharge performance was studied over 10 cycles at 75 mA cm$^{-2}$ leading to energy efficiency on average above 90% and specific capacity of around 49 Wh L$^{-1}$ without considering the volume of gas produced (FIG. 19B).

Figure 20:
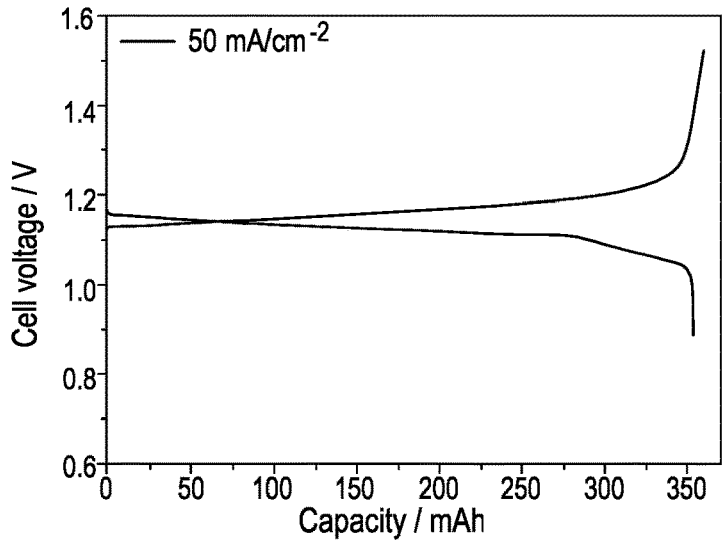
FIG. 20 shows Galvanostatic charge and discharge at 50 mA cm$^{-2}$ of a $H_2$—V RFB using 0.2M $NH_4H_2PO_4$ as additive. Electrolyte 3M $VOSO_4$ in 3M $H_2SO_4$. Liquid flow rate 50 mL min$^{-1}$. Gas flow rate: 100 mL min$^{-1}$.

Another positive electrolyte formulation independently reported is the in-situ formation or addition of NH$_4$H$_2$PO$_4$ as additive. This moiety has shown ability to stabilize V(V) for longer periods with high concentration (3M). Such electrolyte formulation, has never been explored in a H$_2$-Vanadium concentration. FIG. 20 shows the first successful galvanostatic charge and discharge of such system using a Platinum Black—Carbon Paper Electrode anode (Fuel Cell Store, 0.5 mgPt cm-2 loading), a Nafion 117 membrane and SGL Sigracet graphite felt cathode and a current density of 50 mA cm$^{-2}$. The electrolyte formulation was 3M VOSO$_4$ in 3M H$_2$SO$_4$ containing 0.2M of NH$_4$H$_2$PO$_4$. FIG. 20 illustrates in particular galvanostatic charge and discharge at 50 mA cm$^{-2}$ of a H$_2$—V RFB using 0.2M NH$_4$H$_2$PO$_4$ as additive; electrolyte 3M VOSO$_4$ in 3M H$_2$SO$_4$; liquid flow rate 50 mL min$^{-1}$; Gas flow rate: 100 mL min$^{-1}$.

Alternative additives also considered beneficial, particularly in the context of Vanadium electrolytes, include other phosphate species such as potassium phosphate and sodium hexametaphophate (SHMP) among others. Additives may include one or more of the following, amongst others: Ammonium Carbonate, Polyacrylic acid, Polyacrylamide, Polymaleic acid, Alanine, Glycine, SodiumPolyPhos., Sod.TriPolyPhos, Ammonium Sulphate, Potassium Sulphate, Poly Styrene S. Acid, Teric PE61, ICI, Teric BL8, ICI, Flocon-100, Calgon EL-5600, Briquest 3010-25, pHreedom, SHMP, K2SO4, K3PO4, KHSO4, Ethlyene diamine tetramethylene phosphonic acid (EDTMP), and CL-4000.

The invention claimed is:

1. A regenerative fuel cell capable of operating in a power delivery mode in which it generates electrical power by the reaction of electrochemically active species at an anode and a cathode and in an energy storage mode in which it consumes electrical power to generate said electrochemically active species, the cell comprising:
a reversible hydrogen gas anode, in an anode compartment;
a reversible cathode in a cathode compartment;
a membrane separating the anode compartment from the cathode compartment, which membrane is capable of selectively passing protons;
conduits configured to supply electrochemically active species to the anode and to the cathode in said power delivery mode, and to carry generated electrochemically active species away from the anode and away from the cathode in said energy storage mode;
wherein the redox reaction at the anode is:
$2H^+ + 2e^- \leftrightarrows H_2$ (gas);
the redox reaction at the cathode is selected from:
(i) $V^{5+} + e^- \leftrightarrows V^{4+}$,
(ii) $Ce^{4+} + e^- \leftrightarrows Ce^{3+}$, and
(iii) $Mn^{3+} + e^- \leftrightarrows Mn^{2+}$; and
the cathode compartment comprises an additive comprising at least one of:
(i) Ti(IV),
(ii) Al(III),
(iii) a surfactant,
(iv) a chelating agent
(v) a polymer, and
(vi) a dendrimer.

2. The regenerative fuel cell of claim 1, wherein the redox reaction at the cathode is:
$Mn^{3+} + e^- \leftrightarrows Mn^{2+}$.

3. The regenerative fuel cell of claim 1, wherein the cathode compartment comprises an additive comprising Ti(IV).

4. The regenerative fuel cell of claim 1, wherein the cathode compartment comprises $Ti(SO_4)_2$.

5. The regenerative fuel cell of claim 1, wherein the cathode compartment comprises $TiO^{2+}$ ions.

6. The regenerative fuel cell of claim 1, which includes at least one vessel configured to contain the liquid catholyte containing the cathodic electrochemically active species, which first vessel is connected, in the power delivery mode, to the catholyte compartment for delivering liquid catholyte containing the electrochemically active species to the catholyte compartment.

7. The regenerative fuel cell of claim 6, wherein the at least one vessel is connected, in the energy storage mode, to the catholyte compartment for receiving catholyte containing generated electrochemically active species from the catholyte compartment.

8. The regenerative fuel cell of claim 1, which includes at least one vessel configured to contain the liquid catholyte containing spent electrochemically active species, which second vessel is connected, in the power delivery mode, to a conduit for receiving the catholyte containing spent electrochemically active species from the catholyte compartment.

9. The regenerative fuel cell of claim 8, wherein said at least one vessel is connected, in the energy storage mode, to a conduit for supplying the catholyte containing spent electrochemically active species to the catholyte compartment.

10. The regenerative fuel cell of claim 1, which includes a pressurized gas source vessel configured to contain hydrogen, which gas source is connectable, in the power delivery mode, to the anode.

11. The regenerative fuel cell of claim 10, wherein the pressurised gas source vessel is connectable, in the energy storage mode, to the anode to receive hydrogen generated in the energy storage mode.

12. The regenerative fuel cell of claim 11, which includes at least one compressor configured to pressurise hydrogen generated at the anode in the energy storage mode for storage in the pressurised gas source vessel, and optionally also a hydrogen expander- generator to deliver electricity as a result of expansion of the compressed gas.

13. The regenerative fuel cell of claim 1, wherein the membrane is a proton exchange membrane.

14. The regenerative fuel cell of claim 1, wherein the membrane is porous to hydrogen ions and solvated hydrogen ions.

15. A method of operating a regenerative fuel cell in a) a power delivery mode in which it generates electrical power by the reaction of electrochemically active species at an anode and at a cathode and b) in an energy storage mode in which it consumes electrical power to generate said electrochemically active species, the cell comprising:
a reversible hydrogen gas anode, in an anode compartment;
a reversible cathode in a cathode compartment;
a membrane separating the anode compartment from the cathode compartment, which membrane is capable of selectively passing protons;
and wherein the method comprises, in said power delivery mode, carrying electrochemically active species to the anode and to the cathode and, in a energy storage mode, carrying generated electrochemically active species away from the anode and away from the cathode wherein the redox reaction at the anode is:
$2H^+ + 2e^- \leftrightarrows H_2$ (gas);
the redox reaction at the cathode is selected from:
(i) $V^{5+} + e^- \leftrightarrows V^{4+}$,
(ii) $Ce^{4+} + e^- \leftrightarrows Ce^{3+}$,
(iii) $Mn^{3+} + e^- \leftrightarrows Mn^{2+}$; and
the cathode compartment comprises an additive comprising at least one of:
(i) Ti(IV),
(ii) Al(III),
(iii) a surfactant,
(iv) a chelating agent
(v) a polymer, and
(vi) a dendrimer.

16. The method according to claim 15, wherein the redox reaction at the cathode is:
$Mn^{3+} + e^- Mn^{2+}$.

17. The method according to claim 15, wherein the cathode compartment comprises an additive comprising Ti(IV).

18. The method as claimed in claim 15, wherein the regenerative fuel cell is as claimed in claim 1.

19. The regenerative fuel cell of claim 1, wherein the cathode compartment comprises an additive comprising Ti(IV), and the redox reaction at the cathode is:
$Mn^{3+}+e^- \pi Mn^{2+}$.

20. The regenerative fuel cell of claim 15, wherein the cathode compartment comprises an additive comprising Ti(IV), and the redox reaction at the cathode is:
$Mn^{3+}+e^- \pi Mn^{2+}$.

\* \* \* \* \*